(12) United States Patent
Agarwal

(10) Patent No.: US 11,077,825 B2
(45) Date of Patent: Aug. 3, 2021

(54) SYSTEM AND METHOD FOR ANTI-TAMPERING MECHANISM

(71) Applicant: PLUSAI LIMITED, Central (HK)

(72) Inventor: Ankur Agarwal, Cupertino, CA (US)

(73) Assignee: PLUSAI LIMITED, Central (HK)

( * ) Notice: Subject to any disclaimer, the term of this patent is extended or adjusted under 35 U.S.C. 154(b) by 0 days.

(21) Appl. No.: 16/715,268

(22) Filed: Dec. 16, 2019

(65) Prior Publication Data
US 2021/0179019 A1    Jun. 17, 2021

(51) Int. Cl.
*B60R 25/10*    (2013.01)
*B60R 25/32*    (2013.01)
*B60R 25/34*    (2013.01)

(52) U.S. Cl.
CPC .......... *B60R 25/1004* (2013.01); *B60R 25/32* (2013.01); *B60R 25/34* (2013.01); *B60R 2325/106* (2013.01)

(58) Field of Classification Search
CPC ........................... B60R 25/1004; B60R 25/32
USPC .... 340/429, 517, 519, 521, 425.1, 635, 638, 340/540, 541
See application file for complete search history.

(56) References Cited

U.S. PATENT DOCUMENTS

| 7,388,616 | B2 | 6/2008 | Yamazaki |
| 10,578,716 | B1 | 3/2020 | Hu |
| 10,697,810 | B1 | 6/2020 | Tjaden |
| 10,717,411 | B1 * | 7/2020 | Diehl .................. G01L 1/16 |

| 2006/0250500 | A1 | 11/2006 | Gloger |
| 2007/0217091 | A1 | 3/2007 | Florin |
| 2009/0095074 | A1 | 4/2009 | Vinshtok |
| 2009/0095075 | A1 | 4/2009 | Vinshtok |
| 2011/0011180 | A1 | 1/2011 | Wilson |
| 2013/0028588 | A1 | 1/2013 | Suman |
| 2014/0334080 | A1 | 11/2014 | Kurle |
| 2015/0185592 | A1 | 7/2015 | Eineren |
| 2016/0156816 | A1 | 6/2016 | Brown |
| 2016/0264064 | A1 | 9/2016 | Byrne |
| 2016/0272163 | A1 | 9/2016 | Dreiocker |
| 2016/0282468 | A1 | 9/2016 | Gruver |

(Continued)

FOREIGN PATENT DOCUMENTS

| DE | 102016006039 A1 | 11/2016 |
| EP | 3228508 A1 | 10/2017 |
| JP | 2009081765 A1 | 4/2009 |

OTHER PUBLICATIONS

Extended European Search Report dated Apr. 28, 2021 in European Application 20214056.2.
Office Action dated Mar. 26, 2021 in U.S. Appl. No. 16/715,499.

*Primary Examiner* — Tai T Nguyen
(74) *Attorney, Agent, or Firm* — Pillsbury Winthrop Shaw Pittman LLP

(57) ABSTRACT

The present teaching relates to method, system, medium, and implementations for detecting sensor tampering. Information is received from an inertial measurement unit (IMU) attached to a structure hosting at least one sensor. The information includes one or more measurements associated with the IMU. The at least one sensor is deployed on a vehicle for sensing surrounding information to facilitate autonomous driving. The one or more measurements are analyzed with respect to pre-determined criteria to detect tampering of the at least one sensor. When the tampering is detected, a response is generated to the event.

21 Claims, 36 Drawing Sheets

(56) References Cited

U.S. PATENT DOCUMENTS

| | | |
|---|---|---|
| 2016/0297361 A1 | 10/2016 | Drazan |
| 2016/0297437 A1 | 10/2016 | Hara |
| 2017/0058565 A1 | 3/2017 | Sanchez |
| 2017/0176576 A1 | 6/2017 | Kotelnikov |
| 2017/0316683 A1 | 11/2017 | Pietrasik |
| 2017/0357009 A1 | 12/2017 | Raab |
| 2017/0364039 A1 | 12/2017 | Schober |
| 2018/0088331 A1 | 3/2018 | Wall |
| 2018/0093644 A1 | 4/2018 | Lin |
| 2018/0113331 A1 | 4/2018 | Wang |
| 2018/0370500 A1 | 12/2018 | Garcia |
| 2019/0068847 A1 | 2/2019 | Obi |
| 2019/0077376 A1 | 3/2019 | Baldovino et al. |
| 2019/0210567 A1* | 7/2019 | Frederick ............ B60R 25/34 |
| 2019/0331509 A1 | 10/2019 | Pizzimenti |
| 2019/0377072 A1 | 12/2019 | Astrom |
| 2020/0082188 A1* | 3/2020 | Singh ............ G06K 9/00832 |
| 2020/0142187 A1 | 5/2020 | Hu |
| 2020/0148133 A1 | 5/2020 | Lin |
| 2020/0159010 A1 | 5/2020 | Kuwae |
| 2020/0207358 A1 | 7/2020 | Katz |
| 2020/0233940 A1 | 7/2020 | Edwards |
| 2020/0262377 A1 | 8/2020 | Salter |
| 2020/0391698 A1 | 12/2020 | Fukuda |
| 2020/0406908 A1* | 12/2020 | Soryal ............ B60R 11/04 |
| 2021/0051252 A1 | 2/2021 | Cotoros |

* cited by examiner

SYSTEM AND METHOD FOR ANTI-TAMPERING MECHANISM

CROSS-REFERENCE TO RELATED APPLICATIONS

The present application is related to U.S. patent application Ser. No. 16/715,232, filed Dec. 16, 2019, U.S. patent application Ser. No. 16/715,306, filed Dec. 16, 2019, U.S. patent application Ser. No. 16/715,375, filed Dec. 16, 2019, U.S. patent application Ser. No. 16/715,499, filed Dec. 16, 2019, U.S. patent application Ser. No. 16/715,624, filed Dec. 16, 2019, and U.S. patent application Ser. No. 16/715,657, filed Dec. 16, 2019, which are hereby incorporated by reference in their entireties.

BACKGROUND

1. Technical Field

The present teaching generally relates to sensors. More specifically, the present teaching relates to sensor assembly.

2. Technical Background

With the advancement of sensing technologies, automation in different industries relies on advanced sensing technologies to provide information about the surrounding of the automation site which forms the basis for various computerized decision makings. For example, different automated assembly lines in different manufacturing sites deploy various sensors to provide crucial information for the robots operating at such sites to operate properly. As another example, driverless vehicle is an emerging field where sensing technology is essential for facilitating the computer system in a moving vehicle to make correct vehicle control decisions in dynamic situations. In such applications, sensors in multiple modalities may be deployed on different parts of a vehicle in order to constantly provide observations of the surrounding of the moving vehicle. Such observations may include visual, acoustic, and 3D depth information. For instance, the moving vehicle needs to "see" clearly and accurately what obstacles are in the field of view and to determine various relevant parameters associated with each of the observed obstacles. For instance, an autonomous vehicle needs to determine what is the pose of each obstacle in the field of view, whether each such obstacle is in motion, what is the velocity of each such obstacle, and how far is each such obstacle from the moving vehicle at each moment. Such parameters need to be obtained based on continuous, clear, and accurate information from sensors in order for the computer system to successfully achieve obstacle avoidance in real time. Therefore, there is a need to ensure that sensors deployed on autonomous driving vehicles continuously provide accurate and uninterrupted performance.

SUMMARY

The teachings disclosed herein relate to methods, systems, and programming for data processing. More particularly, the present teaching relates to methods, systems, and programming related to modeling a scene to generate scene modeling information and utilization thereof.

In one example, a method, implemented on a machine having at least one processor, storage, and a communication platform capable of connecting to a network for detecting sensor tampering. Information is received from an inertial measurement unit (IMU) attached to a structure hosting at least one sensor. The information includes one or more measurements associated with the IMU. The at least one sensor is deployed on a vehicle for sensing surrounding information to facilitate autonomous driving. The one or more measurements are analyzed with respect to pre-determined criteria to detect tampering of the at least one sensor. When the tampering is detected, a response is generated to the event.

In a different example, the present teaching discloses a system for detecting sensor tampering, which includes an update controller and a sensor special operation controller. The update controller is configured for receiving, from an inertial measurement unit (IMU) attached to a structure hosting at least one sensor, information including one or more measurements associated with the IMU and analyzing the one or more measurements with respect to pre-determined criteria to detect tampering of the at least one sensor. The at least one sensor is deployed on a vehicle for sensing surrounding information to facilitate autonomous driving. The sensor special operation controller is configured for generating, if the tampering is detected, a response to the tampering detected.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for detecting sensor tampering, wherein the medium, when read by the machine, causes the machine to perform a series of steps. Information is received from an inertial measurement unit (IMU) attached to a structure hosting at least one sensor. The information includes one or more measurements associated with the IMU. The at least one sensor is deployed on a vehicle for sensing surrounding information to facilitate autonomous driving. The one or more measurements are analyzed with respect to pre-determined criteria to detect tampering of the at least one sensor. When the tampering is detected, a response is generated to the event Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the current state of the art in quality and accurate sensing in autonomous vehicles. As discussed herein, to ensure safe autonomous driving, having sensors reliably provide accurate information about the surrounding of the vehicle is essential. The reliability requires assurance of presence of sensors mounted where they should be. As vehicles may be exposed to the public (e.g., when parking on the street or a parking place), it is important to incorporate means to prevent tampering of the sensors on the vehicle. The accuracy of the acquired information requires that such sensors are in a condition to be able to obtain information of the surrounding in a truthful and unambiguous manner. To sense the information intended, most sensors are installed so that they are exposed to the open space, subject to rain, snow, dust, sunshine, and often debris from different sources. The present inventions disclose different means and embodiments thereof to address the reliability and accuracy issues.

Figure 1:
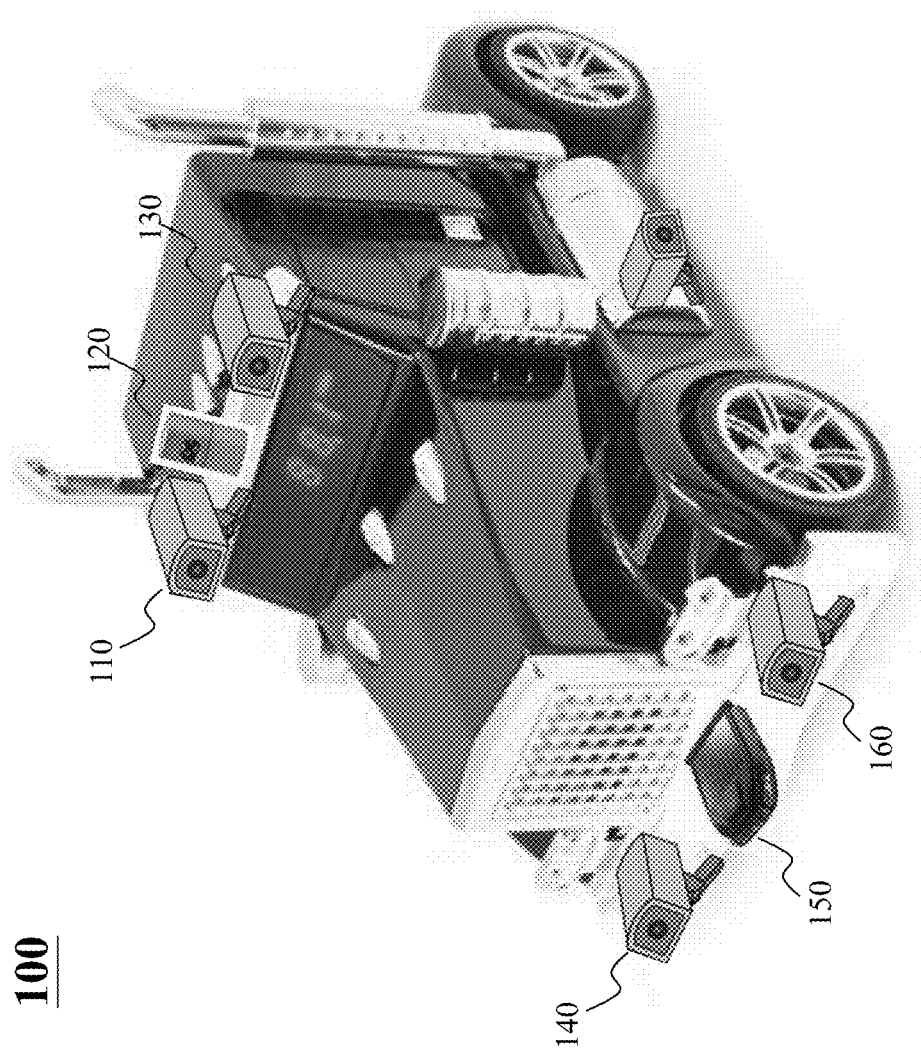
FIG. 1 illustrates an autonomous vehicle with sensors deployed thereon, in accordance with an embodiment of the present teaching.

FIG. 1 illustrates an autonomous vehicle 100 with different sensors deployed thereon, in accordance with an embodiment of the present teaching. In this illustrated embodiment, the autonomous vehicle is a truck (without trailer) that has sensors mounted on top and in front of the vehicle. The exemplary sensors as shown in FIG. 1 includes, for instance, stereo cameras 110 and 130 on top of the truck 100 for observing obstacles located in front of the vehicle, a LiDAR sensor 120 for providing depth information of the front view, a radar sensor 150 at the front of the truck, and additional cameras 140 and 150 for observing the road conditions. These exemplary sensors are installed at their designated positions and each is responsible for certain roles to gather specific type of information useful for the vehicle to make autonomous driving related decisions. For example, stereo camera pair 110 and 130 may be designated to not only see the scenes (objects such as trees, road signs, buildings, other obstacle vehicles, and lane marks, etc.) but also estimate the depth of the objects observed. The LiDAR sensor 120 may be designated to measure the depth information of the scene in front of the vehicle 100 and produce a depth map. Radar sensor 150 may be used to sense the obstacles at the low height to detect any obstacles on the road surface in front of the vehicle. Camera 140 and 160 may be used to detect the obstacles close to the road surface such as lane marks immediately before the vehicle.

Figure 2A:
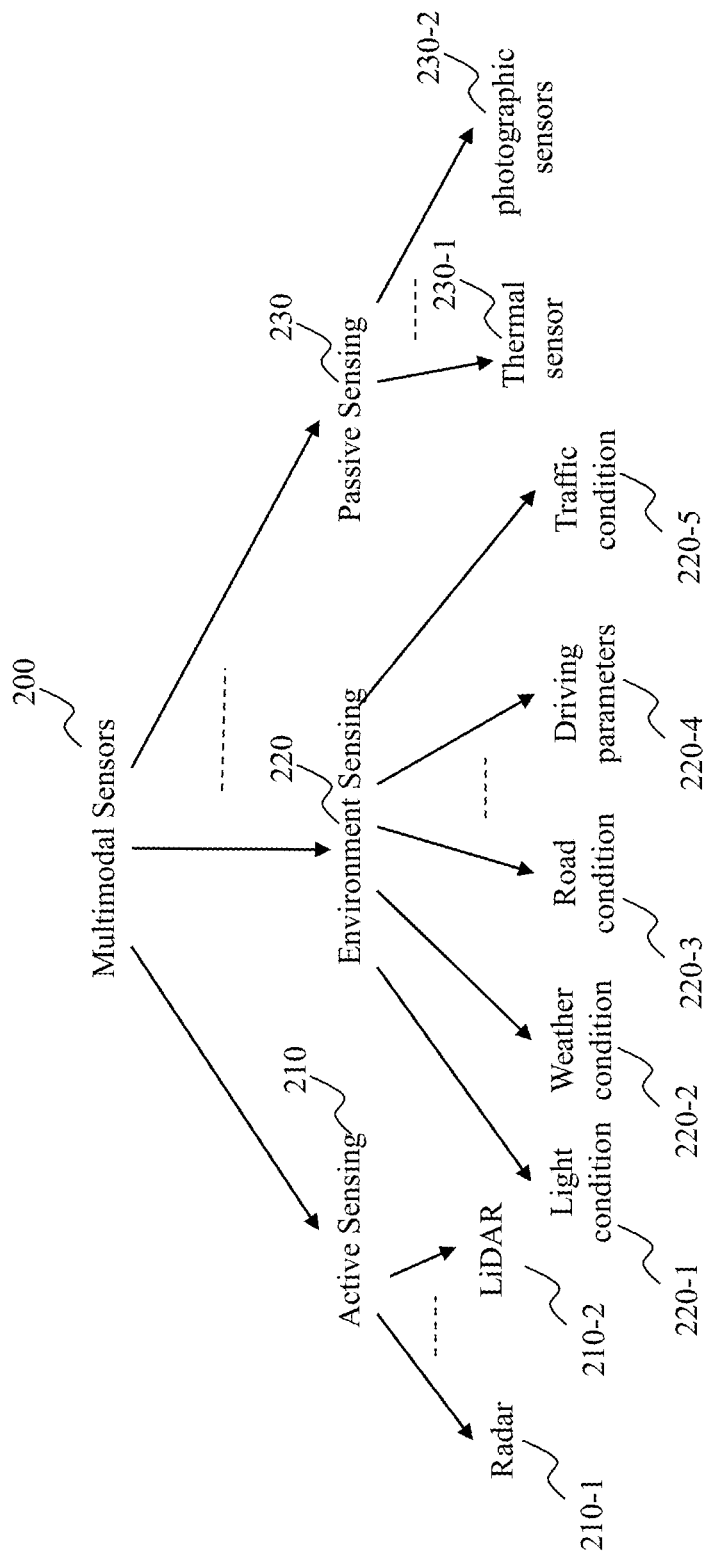
FIG. 2A shows exemplary types of sensors that may be deployed on an autonomous vehicle, in accordance with an embodiment of the present teaching.

Different types of sensors may be deployed on an autonomous vehicle. FIG. 2A shows exemplary types of sensors that may be deployed on an autonomous vehicle, in accordance with an embodiment of the present teaching. Sensors may be in multiple modalities (200). Some sensors may be directed for active sensing (210), some may be directed for environment sensing (220), and some may be passive sensing (230). Examples of active sensors may include radar sensor (210-1), LiDAR sensor (210-2), that act (emit and measure) actively to collect information needed. Examples of passive sensors include photographic sensors such as cameras (230-2) or thermal sensors (230-1) that collect data on whatever imprinted on them. Environment sensing may be conducted based on information from one or more sensors and what is sensed is about the environment such as the lighting condition (220-1), the weather condition such as rain or snow (220-2), the condition of the road such as being wet or covered by snow (220-3), driving related parameters such as slope of the road (220-4), . . . , and condition of the traffic such as how crowded the road is (220-5).

Figure 2B:
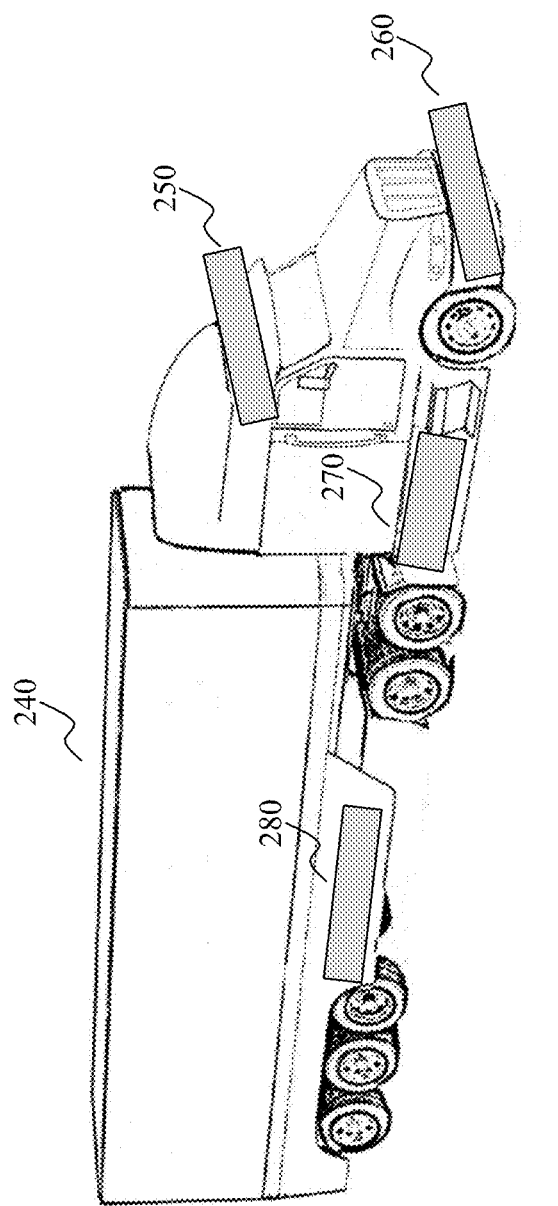
FIG. 2B depicts exemplary different sensor racks mounted at different parts of a vehicle to provide surround information to facilitate autonomous driving, in accordance with an embodiment of the present teaching

Different sensors responsible for gathering designated information may be strategically installed at appropriate parts of the vehicle. This is shown in FIG. 2B, where different sensor racks are mounted at different parts of a vehicle to provide sensing information to facilitate autonomous driving, in accordance with an embodiment of the present teaching. Each sensor rack may have one or more sensors mounted therein. In this illustrated embodiment, there are four visible sensor racks 250, 260, 270, and 280, installed on different locations of truck 240, respectively, on the top (250), at the low front (260), at the front side (270), and at the right side of the truck (280). There may be parallel or counterpart of sensor racks 270 and 280 installed on the opposing sides of the truck (not shown). Each rack may also have different types of sensors mounted. For instance, the sensors in rack 250 may be for long distance obstacle observation in terms of both visually observable objects and their depth measurements. The sensor rack 260 may include sensors responsible for detecting obstacles in a closer distance to the vehicle 240. The sensors racks installed on both sides of the truck may be for observing obstacles on both sides of the vehicle 240. The back of the truck may also have a rack with sensors designated for observe what is in the rare end of the vehicle. In this manner, the truck is made aware of its surroundings so that any autonomous driving decision may be made according to the surrounding situation.

Figure 3B:
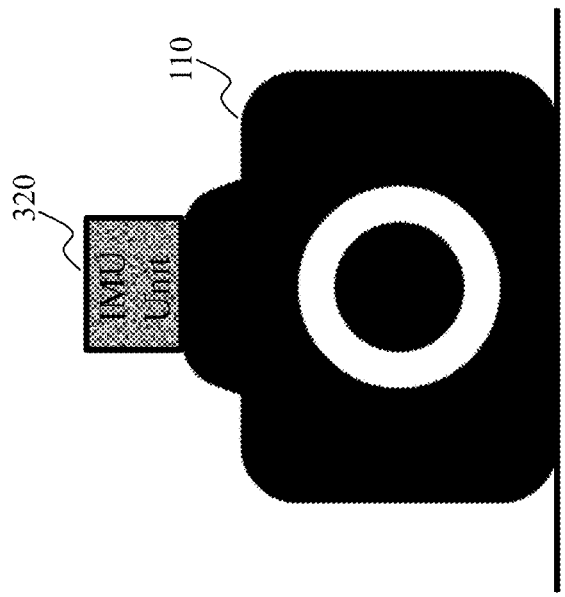
FIGS. 3A-3B show exemplary configurations of attaching an inertial measurement unit (IMU) to a sensor, in accordance with an embodiment of the present teaching.
Figure 3A:
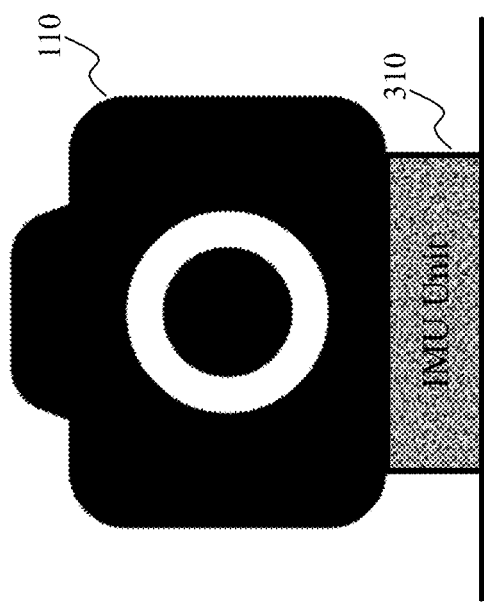

When such sensor racks are installed on a vehicle for their respective roles to collect needed information, it is essential that such sensors are always present when the vehicle is on the move. As the sensors and sensor racks are installed in the clear, it is a reasonable concern that such sensors and sensor racks may be tampered illegally or even stolen, rendering the vehicle not capable of self-driving. According to some embodiments of the present teaching, inertial measurement unit or IMU may be used to implement an anti-tampering mechanism. Such anti-tampering mechanism may be implemented both for individual sensors and for sensor racks. FIGS. 3A-3B show exemplary anti-tampering mechanism for an individual sensor using an IMU, in accordance with an embodiment of the present teaching. FIG. 3A shows that an IMU 310 is attached to a sensor 110 so that the sensor 110 is sitting on top of the IMU 310. FIG. 3B shows a different configuration in which an IMU 320 is attached to the top of a sensor 110. Such an IMU unit is capable of detecting various types of states associated therewith, including its own pose, the vibration it experiences, other types of information the IMU is made to detect. The IMU is also configured to be capable of reporting such detected information so that any disturbances making it deviate from its initial states may be used to detect a tampering event. In some embodiments, the IMU may also be attached to other parts of the sensor, e.g., attaching to its side (not shown). In general, the IMU may be attached to any location of a sensor and be made to continuously report information about its states.

Figure 4A:
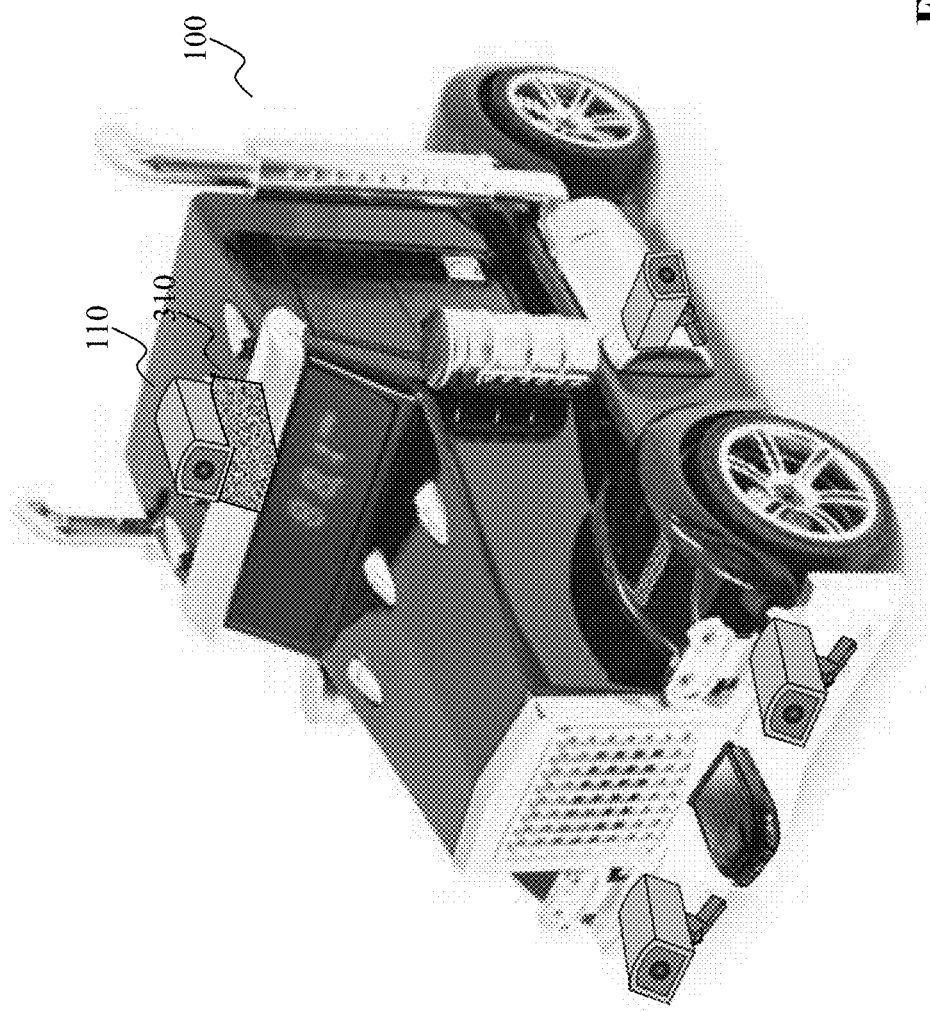
FIGS. 4A-4B show exemplary embodiments of deploying a sensor with an IMU attached thereto on an autonomous vehicle, in accordance with an embodiment of the present teaching.
Figure 4B:
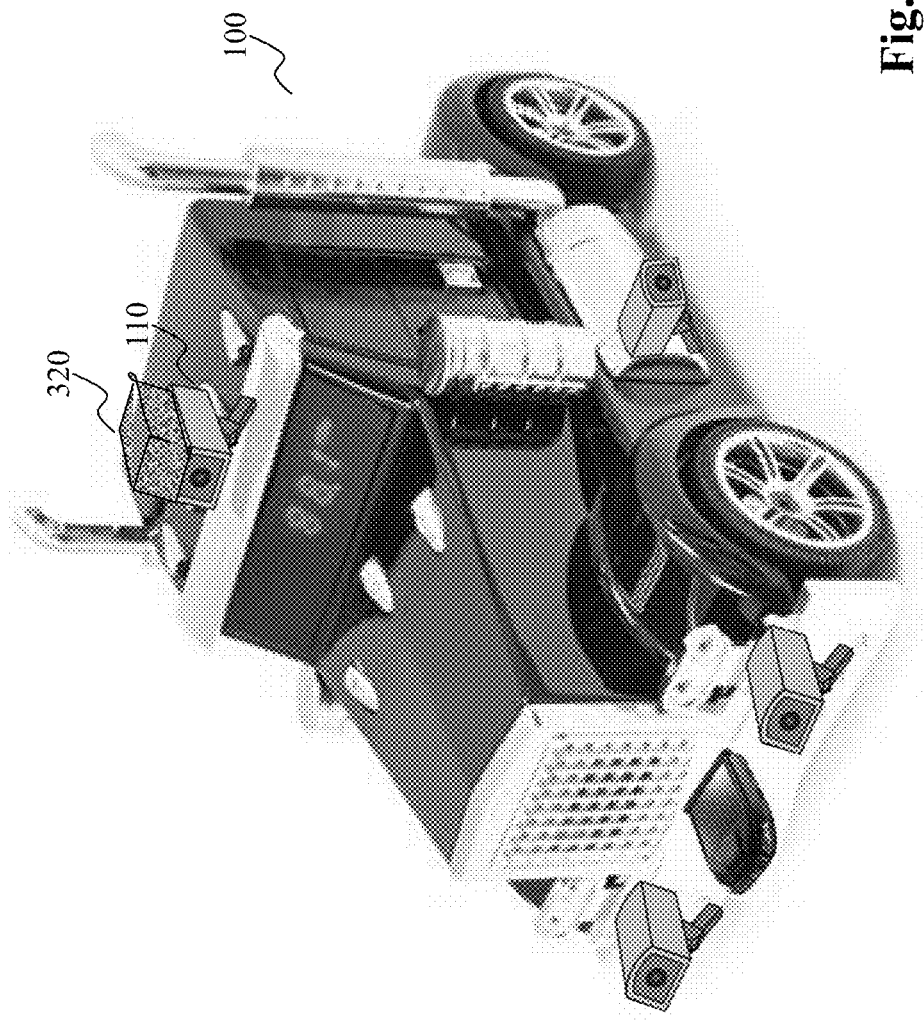
Figure 5:
FIG. 5 shows a fleet of autonomous vehicles with each having sensors mounted thereon to facilitate autonomous driving, in accordance with an embodiment of the present teaching.

In both configurations, the IMU and the sensor are attached to each other in such a way that, when moving the sensor from an affixed pose, the construct (the sensor plus the IMU) will necessarily disturb the pose of the IMU. That is, movement of the sensor results in movement of the IMU. The attachment between the IMU and sensor, or alternatively, the IMU(s) and the sensor housing assembly, may be achieved via different means, either directly or indirectly. In embodiments, mechanical and/or structural mechanisms may be implemented for attachment, such as, but not limited to, strong glue, adhesive, one or more mounting frames, one or more magnets, one or more plates, fasteners, connectors (including lugs, snaps, and corresponding mating devices (e.g., male-female connectors)), and/or combinations thereof. In an embodiment, the IMU and the sensor may be securely mounted within an enclosure or a box for attachment relative to one another. Once attached with each other, the construct containing both the sensor and the IMU may be installed as one unit on the vehicle, as shown respectively in FIGS. 4A and 4B. FIG. 4A shows that a sensor 110 with an IMU 310 attached thereto in a configuration as shown in FIG. 3A as a construct which is then mounted on top of vehicle 100. FIG. 4B shows that a sensor 110 and an IMU 320 are attached together in a configuration as shown in FIG. 3B as a construct which is then mounted on top of vehicle 100. To move sensor 110 from vehicle 100, one can move the entire construct because each of the sensor 110 and IMU is not individually separable. With this mechanism, when vehicles are in a parking state, as shown in FIG. 5, if the sensors mounted on such parked vehicles are tampered with, the attached IMUs will sense a disturbance of the poses and may then take actions such as yielding an alarm. Details are discussed in reference to FIGS. 8A-10B.

Figure 6:
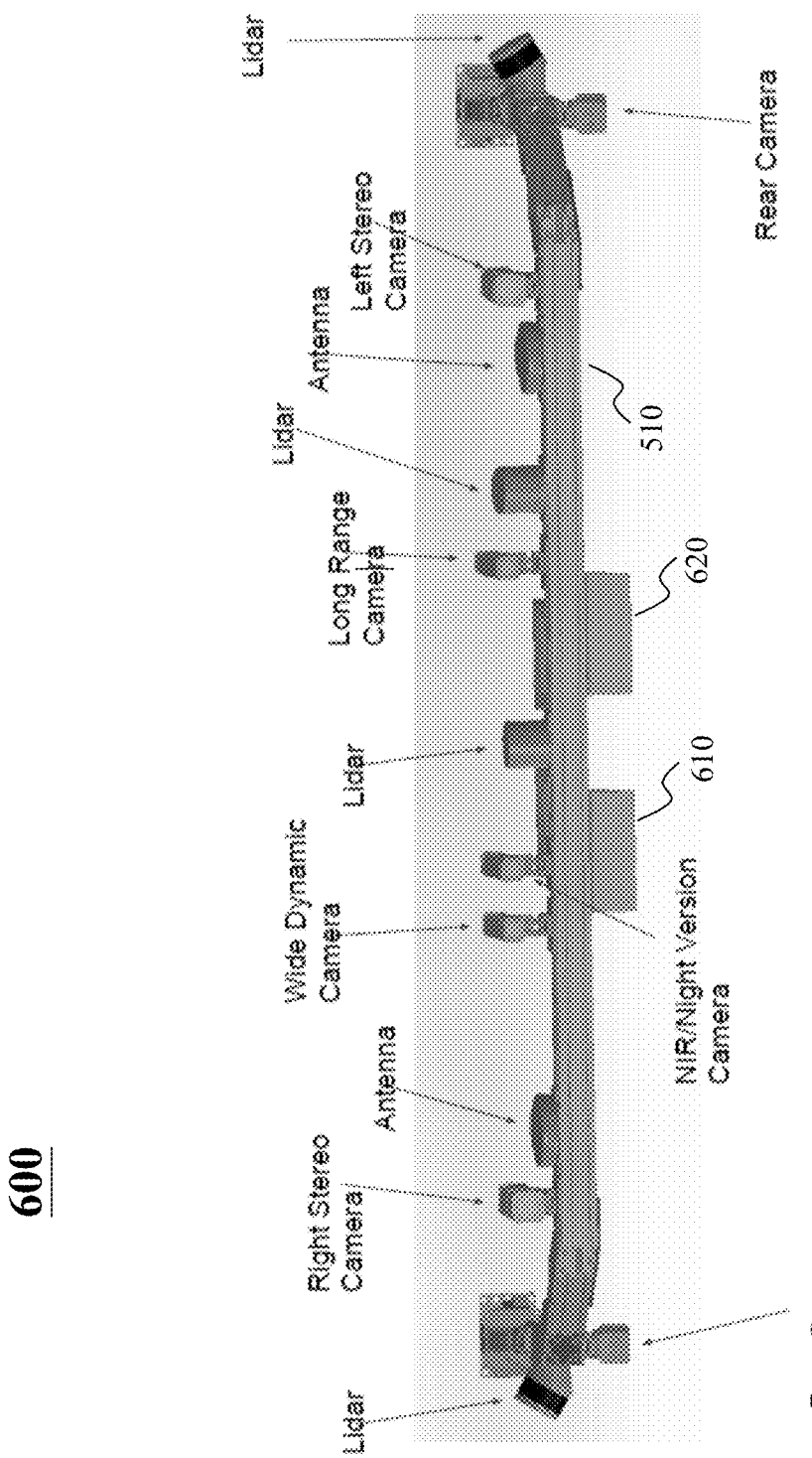
FIG. 6 depicts an exemplary sensor rack with different types of sensors mounted thereon, in accordance with an embodiment of the present teaching.

As discussed herein, sensors deployed on an autonomous vehicle may also be mounted in a sensor rack. FIG. 6 depicts an exemplary sensor rack with different types of sensors mounted thereon, in accordance with an embodiment of the present teaching. As shown, a sensor rack 600 has different types of sensors mounted thereon, including, e.g., stereo pair cameras (left and right stereo cameras), LiDAR sensors, wide dynamic camera, long range camera, night vision camera, and rare cameras, etc. When such a sensor rack is installed on a vehicle, each of the sensors installed therein may be deployed to play their respective sensing roles. Such a sensor rack may also be subject to tampering or stealing. To prevent such tampering, the disclosed approach of using IMU unit may also be applied to sensor racks.

Figure 7A:
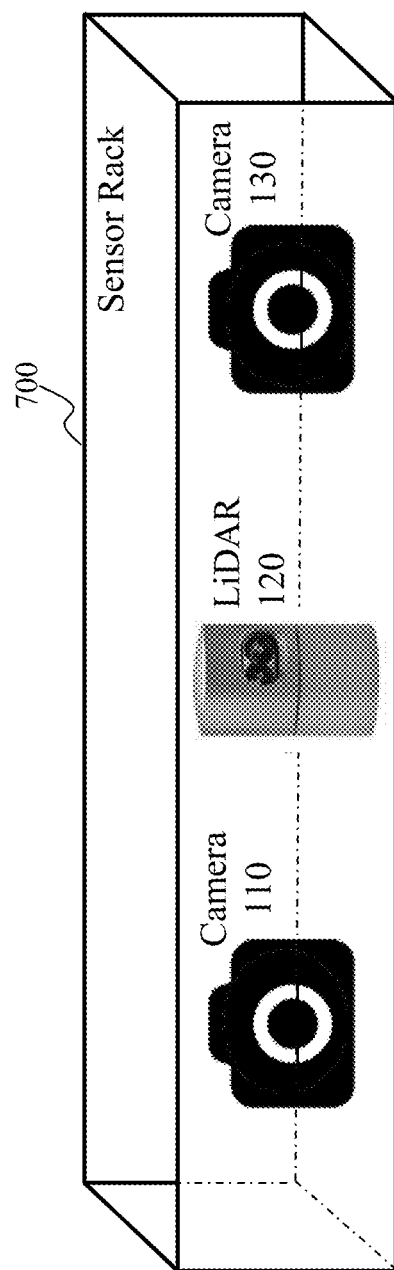
FIG. 7A depicts an exemplary conceptual sensor rack with sensors of different modalities installed therein, in accordance with an embodiment of the present teaching.
Figure 7B:
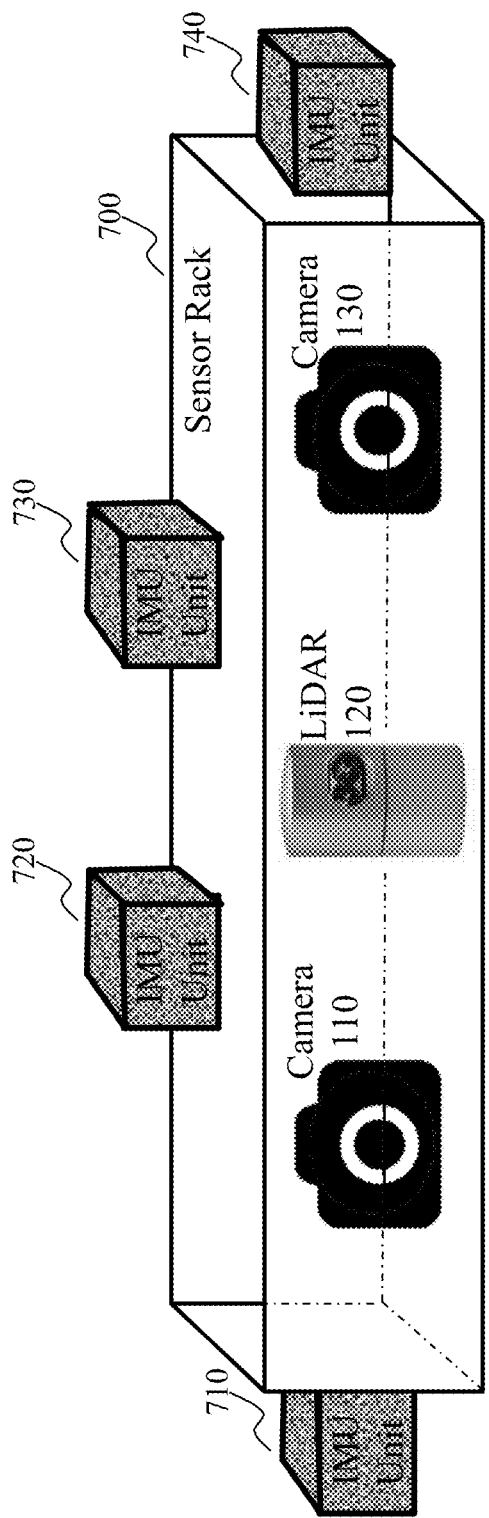
FIG. 7B depicts an exemplary conceptual sensor rack having sensors installed therein with one or more IMUs attached to the sensor rack, in accordance with an embodiment of the present teaching.

FIG. 7A depicts an exemplary conceptual sensor rack 700 with multiple sensors of different modalities installed therein, in accordance with an embodiment of the present teaching. Although only three sensors in two different modalities are shown therein are only two types of sensors, it is merely for illustration instead of as a limitation. As shown in FIG. 6, more and more types of sensors may be installed in a single sensor rack. In the embodiment illustrated in FIG. 7A, there are two cameras (110 and 130, which may be a stereo pair) and one LiDAR sensors (120). Such a sensor rack may be mounted on a vehicle and measures need to be employed to prevent tampering. FIG. 7B depicts the exemplary conceptual sensor rack 700 having sensors installed therein and with one or more IMUs attached to the rack to facilitate tamper detection, in accordance with an embodiment of the present teaching. In this illustrated embodiment, a plurality of IMUs are attached to the sensor rack 700. In general, one or more IMUs may be attached to different locations of the sensor rack 700. In this embodiment, two IMUs (720, 730) are placed on top of the sensor rack 700 and one IMU is attached to either end of the sensor rack 700 (710 and 740). The IMUs in this illustrated embodiment with respect to the sensor rack 700 play the same role as the IMUs attached to individual sensors as shown in FIGS. 3A-4B. That is, if the sensor rack 700 is tampered with, it will cause the IMUs to detect a deviation from their initial poses and such detected deviation may be used to detect tampering.

Figure 8A:
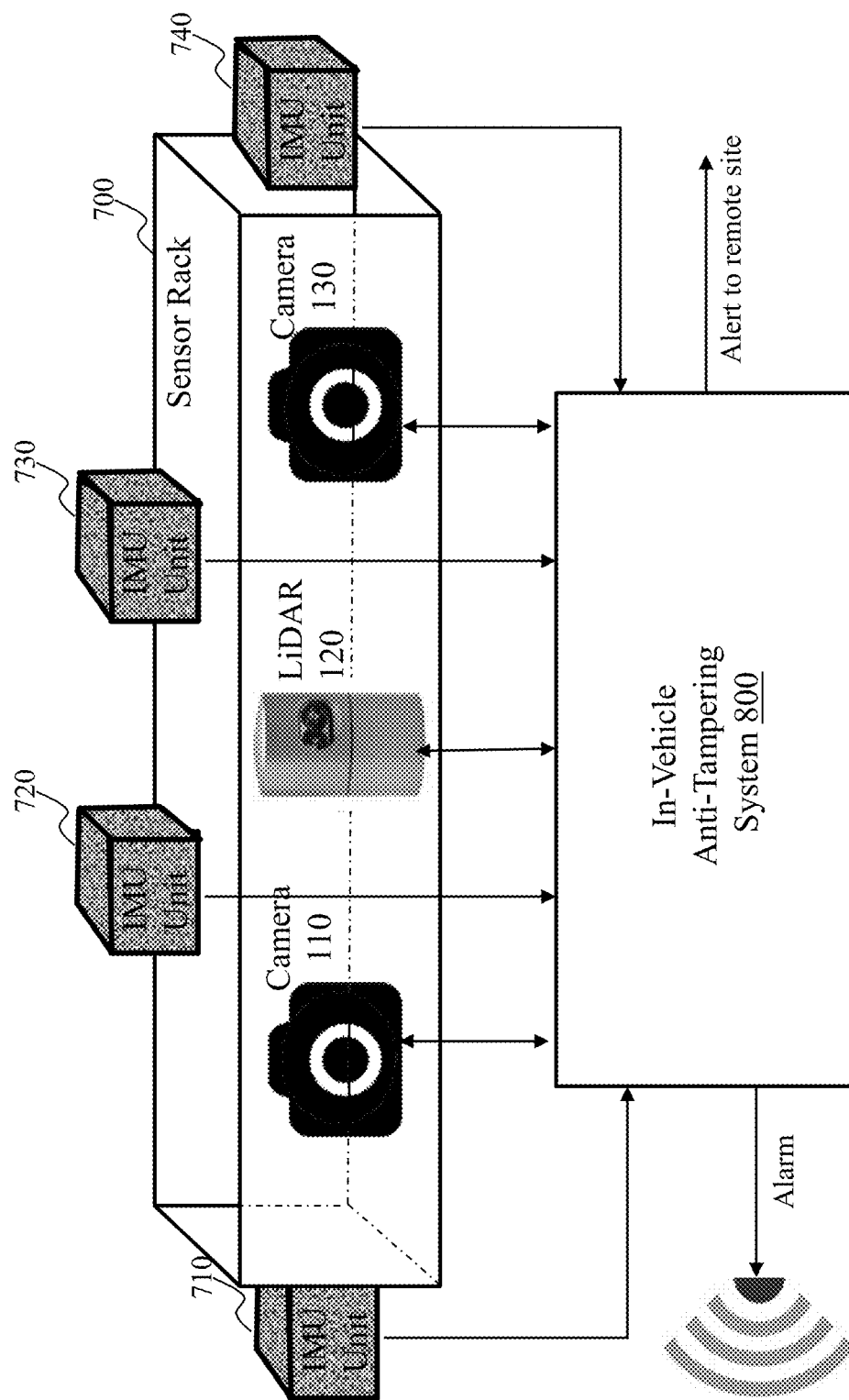
FIG. 8A depicts an anti-tampering mechanism with a sensor rack with IMUs attached thereon in connection with an in-vehicle anti-tampering system, in accordance with an embodiment of the present teaching.

To utilize the detected pose deviation of an IMU for detecting tampering, the IMUs attached to sensors or sensor racks may be in communication with certain anti-tampering mechanism that may be configured to react to any signals from IMUs and take certain actions to prevent tampering. FIG. 8A depicts such an anti-tampering mechanism of a sensor rack with IMUs attached thereon and connected with an in-vehicle anti-tampering system 800, in accordance with an embodiment of the present teaching. In this illustrated embodiment, each of the exemplary IMUs attached to the sensor rack 700 continually, once in operation, checks its pose, state, and vibration and report the detected data. The checks may be continuous with certain configured intervals. The IMUs are in communication with the in-vehicle anti-tampering system 800 so that the IMUs report the detected poses, states, and vibrations to the in-vehicle anti-tampering system 800.

Depending on the received information from the IMUs, the in-vehicle anti-tampering system 800 determines whether there is any tampering event. Such an event may be associated with a severity of the detected data (pose change, vibration) from the IMUs. For example, if the pose deviation and/or vibration reported is beyond some specified range, the in-vehicle anti-tampering system 800 may consider that tampering event is present. To react to a detected tampering event, the in-vehicle anti-tampering system 800 may activate its internal mechanism to trigger alarm. In some embodiments, the in-vehicle anti-tampering system 800 may also send alert signals to some remote sites according to certain configurations. In some embodiments, once the alarm is triggered, the in-vehicle anti-tampering system 800 may not only trigger loud alarm in the vehicle but also activate appropriate (may be all) sensors to start recording the surrounding of the vehicle to capture any information associated with the detected tampering event. Such recorded data from activated sensors may also be sent to the remote sites via the connections thereto.

In some embodiments, the data (pose, state, and vibration) reported from the IMUs may also be used to enable other tasks. For instance, to rely on sensor data to control autonomous driving, sensors on the vehicle need to be calibrated properly. For example, to detect depth of observed obstacles, stereo cameras may be deployed and calibrated so that images from left and right cameras in a stereo pair may be used to compute a depth map. The accuracy of the estimated depth information may be a function of proper calibration. Due to driving, the poses of sensors may change because of, e.g., vibration of the vehicle. Such changes may lead to inaccuracy in stereo based depth estimation, causing problems in autonomous driving. In this situation, re-calibration may be needed based on the new (shifted) poses of the two cameras. The need for such re-calibration may be detected based on the detected pose information from the IMUs and the expected poses of the calibrated cameras. In some situations, if the pose of a camera has changed to a degree that requires the sensor be re-installed, the information from IMUs enables the in-vehicle system 800 to detect that and alert the driver of the vehicle to proceed to fix the mounting of the sensor. Thus, the IMUs may be used for not only the purpose of detecting tampering but also for sensing the need for re-installation and/or re-calibration of some sensors.

Figure 8B:
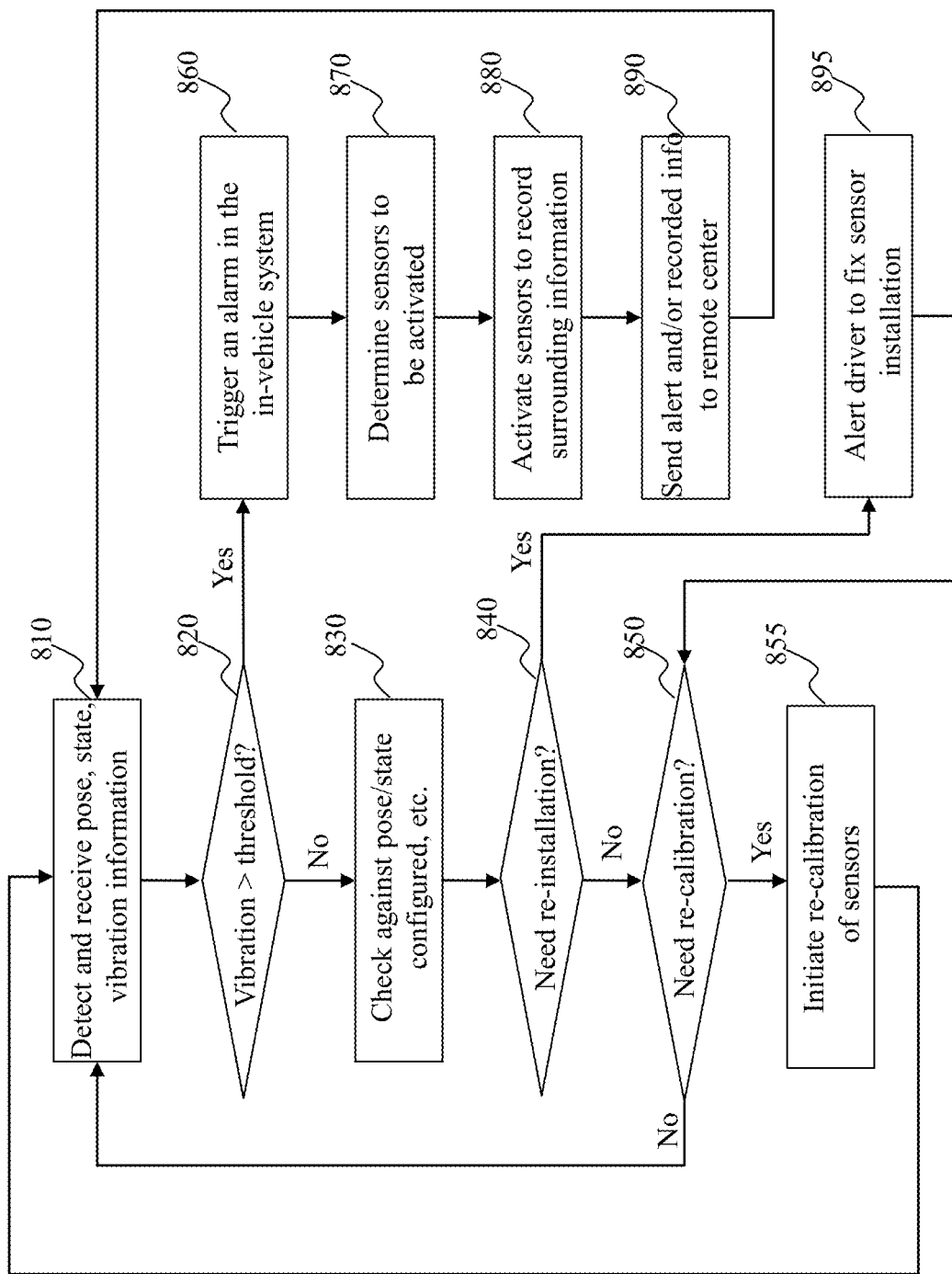
FIG. 8B is a flowchart of an exemplary process of an anti-tampering mechanism, in accordance with an embodiment of the present teaching.

FIG. 8B is a flowchart of an exemplary process of the anti-tampering mechanism shown in FIG. 8A, in accordance with an embodiment of the present teaching. At 810, the IMUs detect the poses, states, and vibrations respectively and send such information to the in-vehicle anti-tampering system 800. Upon receiving the information from the IMUs, the in-vehicle anti-tampering system 800 determines, at 820, whether the detected vibration from any of the IMUS is greater than a threshold. When the vibration level exceeds a threshold, the in-vehicle system 800 considers it as a sensor tampering event. Thus, the first test to be performed is the level of vibration. The threshold on vibration to detect a tampering event may be pre-determined or dynamically determined. For instance, the threshold may be set based on an average level of vibration that the vehicle experienced in the last fixed period of time. If the vehicle has been driving on a rough road, the average level of vibration may be higher so that the threshold for a vibration level that may indicate tampering may be set higher. In some embodiment, the system may be configured in such a way that when the vehicle is in motion, the threshold is set so high that no vibration will trigger a detected tampering event. In some embodiment, when the vehicle is in motion, the in-vehicle anti-tampering system 800 may be configured not to act on the vibration detected and in effect, without detection of a tampering event. That is, the in-vehicle anti-tampering will operate only when the vehicle is in a parking mode. In this mode, the threshold for vibration may be set quite low so that any unexpected vibration may be considered as a tampering event.

If the vibration exceeds the threshold, determined at 820, the in-vehicle anti-tampering system 800 triggers, at 860, the alarm in the vehicle. Such alarm may include certain loud siren-like sound delivered via, e.g., the speakers in the vehicle. In addition, the in-vehicle anti-tampering system 800 may also determine, at 870, some sensors to be activated to record the surround information. For example, based on which IMU reported high level of vibration, sensors located in the vicinity of the IMU may be activated. In some embodiments, the in-vehicle anti-tampering system 800 may active more sensors to record information, e.g., all sensors along the same side of the vehicle where the IMU is located or even all sensors deployed on the vehicle to record information observed. In some embodiments, the sensors to be activated to record information may be of certain types, e.g., visual sensors and acoustic sensors (without LiDAR or radar sensors). The determined sensors are activated at 880 to collect surrounding information. In some embodiments, the in-vehicle anti-tampering system 800 may be configured to information a remote site of the detected tampering event by sending an alert (of the tampering event) and the information collected from the activated sensors to the remote site.

If the vibration level from all IMUs are below the threshold, it may indicate that there is no tampering event. In this case, the in-vehicle system may proceed to detect whether there is any sensor that needs to be re-installed or re-calibrated. As discussed herein, sensors mounted on the vehicle may have been previously calibrated based on their installation positions. During driving and/or over time, the installation may become loose due to, e.g., vibration of the vehicle, causing changes in their poses and hence leading to inaccuracy in detecting obstacles. When the change in a sensor's pose is small, re-calibration may be carried out, which may be done on-the-fly. In some situations, if the change in a sensor's pose is too significant, an on-the-fly calibration may not be able to bring back the accuracy (e.g., when a left camera in a stereo pair becomes severely tilted). In this situation, re-installation may be required.

To detect different situations, information received from the IMUs, i.e., poses/states, may be compared, at 830, against the known or expected (correct) poses/states of the respective sensors. Based on the comparison results, the in-vehicle system 800 determines, at 840, whether re-installation is needed for any of the sensors. If there is any sensor requires re-installation, the in-vehicle system 800 sends an alert, at 895, to the driver indicating which sensor requires a re-installation. Such an alert may be sent to an interface with the driver such as the dashboard or may also be delivered via a voice communication or enter into a log for all maintenance tasks needed for the vehicle. After alerting the driver of the needed re-installation, the in-vehicle system 800 continues to check, at 850, the need for re-calibrating any of the sensors based on the comparison results.

If the comparison results indicate that no re-installation is needed, determined at 840, the in-vehicle system 800 proceeds directly to 850 to check if re-calibration is needed. The need for re-calibration may be determined based on some pre-determined criteria. In some embodiments, such criteria may be defined based on the amount of deviation of the currently detected poses from a known and expected (correct) poses with respect to different types of sensors. For example, for a stereo pair of cameras, a slight drop in height of one camera may cause significant error in estimated depth if the transformation matrix in stereo computation assumes that the left and right cameras be horizontal. In this case, even though the deviation is not significant, re-calibration may be needed. On the other hand, if the height of a LiDAR sensor dropped, it may not matter that much so long as the field of view of the LiDAR camera can still cover the critical region in front of the vehicle. If no re-calibration is needed for any of the sensors, the in-vehicle system 800 proceeds to 810 to receive information (pose/state/vibration) from the IMUs. If any of the sensors requires re-calibration, the in-vehicle system 800 initiates, at 855, the corresponding re-calibration process and then proceeds to 810 to continuously receive information from IMUs.

Figure 9A:
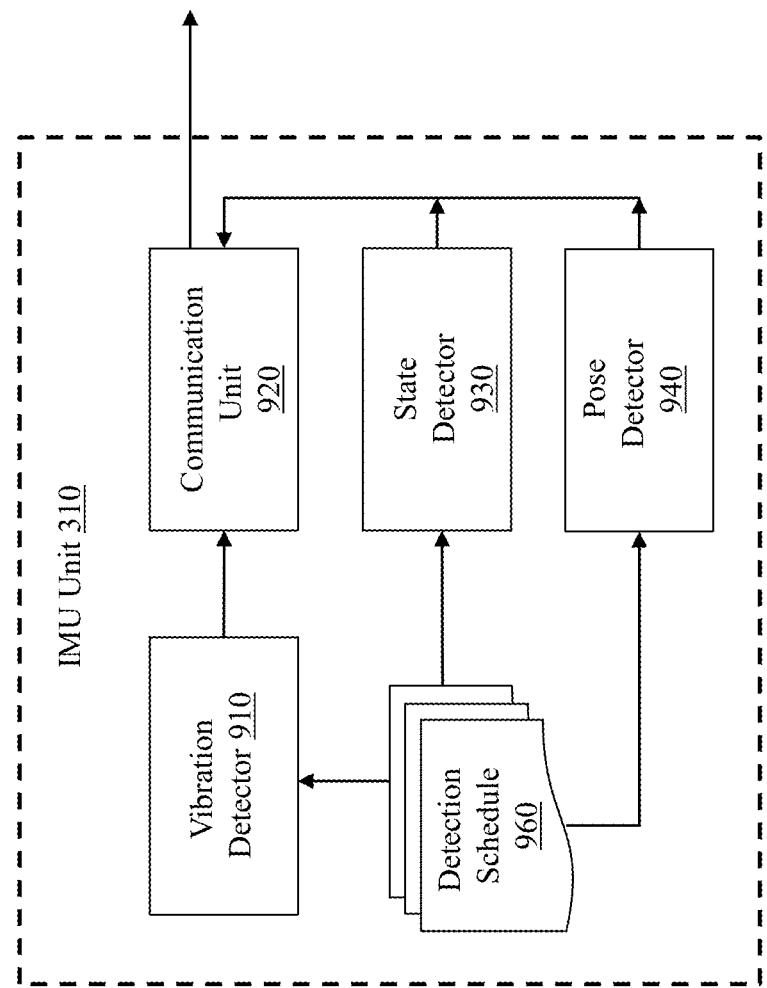
FIG. 9A depicts an exemplary high level system diagram of an IMU, in accordance with an embodiment of the present teaching.

FIG. 9A depicts an exemplary high level system diagram of an IMU, in accordance with an embodiment of the present teaching. In some embodiments, an IMU such as 310 is a reporting device configured to simply detect self-aware information and send such collected information out. In this illustrated embodiment, the IMU 310 comprises a vibration detector 910, a state detector 930, a pose detector 940, and a communication unit 920. The vibration detector 910 is configured to detect the vibration that the IMU experiences. The state detector 930 is configured to detect the current state of the IMU such as its current operational state. The pose detector 940 is configured to detect the current pose of the IMU which may include its latitude, longitude, and orientation. The detection of each detector may be carried out based on some pre-configured schedule stored in a detection schedule 960. The detected information from each of the detectors may then be sent to the communication unit 920 which is then forward the received detection results to the in-vehicle anti-tampering system 800.

Figure 9B:
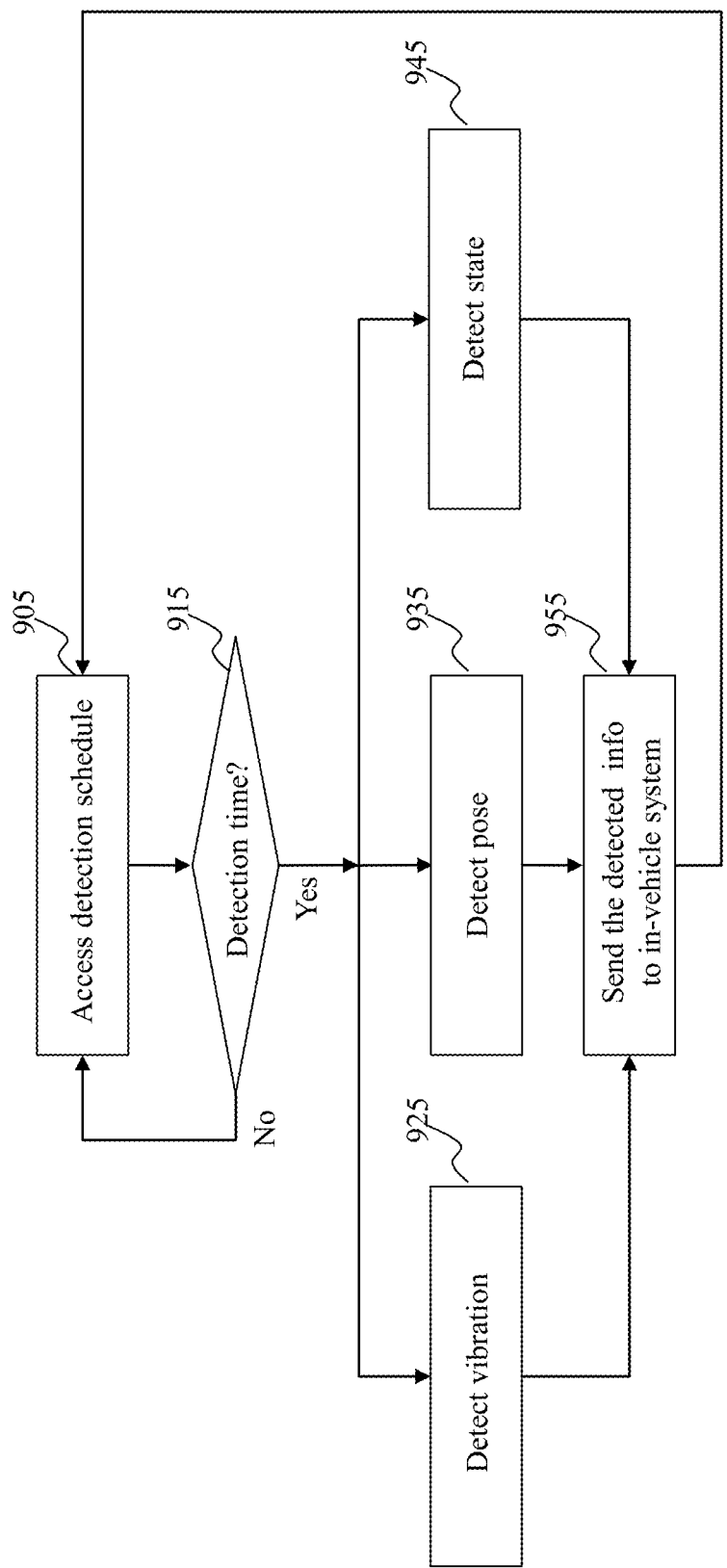
FIG. 9B is a flowchart of an exemplary process of an IMU, in accordance with an embodiment of the present teaching.

FIG. 9B is a flowchart of an exemplary process of an IMU, in accordance with an embodiment of the present teaching. The IMU may be configured to detect different types of information based on a schedule with some pre-determined detection intervals. To control the detection activities, vibration unit 910, state detector 930, and pose detector 940 may access, at 905, the detection schedule stored in 960 and then determine, at 915, whether it is time to detect respective information by each of the detectors based on the schedule. In some embodiments, the schedule for each of the detectors may be configured differently. For example, the scheduled interval for detecting vibrations may be smaller than that of detecting the state and/or pose. The scheduled intervals for each type of information detecting may be set in accordance with, e.g., what the corresponding information signifies and how important the information is with respect to a tampering activity. For instance, vibration that exceeds a certain threshold may signify an on-going tampering event so that it is very important to detect vibration in a timely fashion. On the other hand, information related to a change in a pose may or may not be associated with a tampering event because the pose of the IMU may change with the movement of the vehicle and/or the condition of the road the vehicle is on.

In some embodiments, the schedule for each of the detectors may also be configured dynamically. For instance, while the vehicle is in motion, the scheduled intervals for different detectors may be set longer based on an assumption that it is less likely that tampering will occur when the vehicle is in motion. The intervals may also be set based on ranges of speed at which the vehicle is moving, e.g., the higher speed, the larger intervals, the lower speed, the smaller intervals. At the extreme situation, when the speed of the vehicle reaches zero (parking state), the scheduled intervals may be re-set to small values because it is more likely that tampering will occur when a vehicle is in a parking state.

Once it is determined that a detection of a particular type of information is needed according to the respective detection schedule, the relevant detector proceeds to detect the information it is designated for. For example, if it is determined that it is time for detecting vibration according to the schedule associated with vibration, the vibration detector 910 proceeds to detect, at 925, the level of vibration that the IMU is experiencing. Similarly, if it is determined that it is time for detecting the pose of the IMU according to the schedule associated with pose information, the pose detector 940 proceeds to detect, at 935, the current pose of the IMU. If it is determined that it is time for detecting the state of the IMU according to the schedule associated with vibration, the state detector 930 proceeds to detect, at 935, the state associated with the IMU. The information (whether vibration, pose, or state) detected by one or more of the detectors in the IMU is then sent to the communication unit 920, which is responsible for transmitting, at 955, the information so detected to the in-vehicle anti-tampering system 800.

Figure 10A:
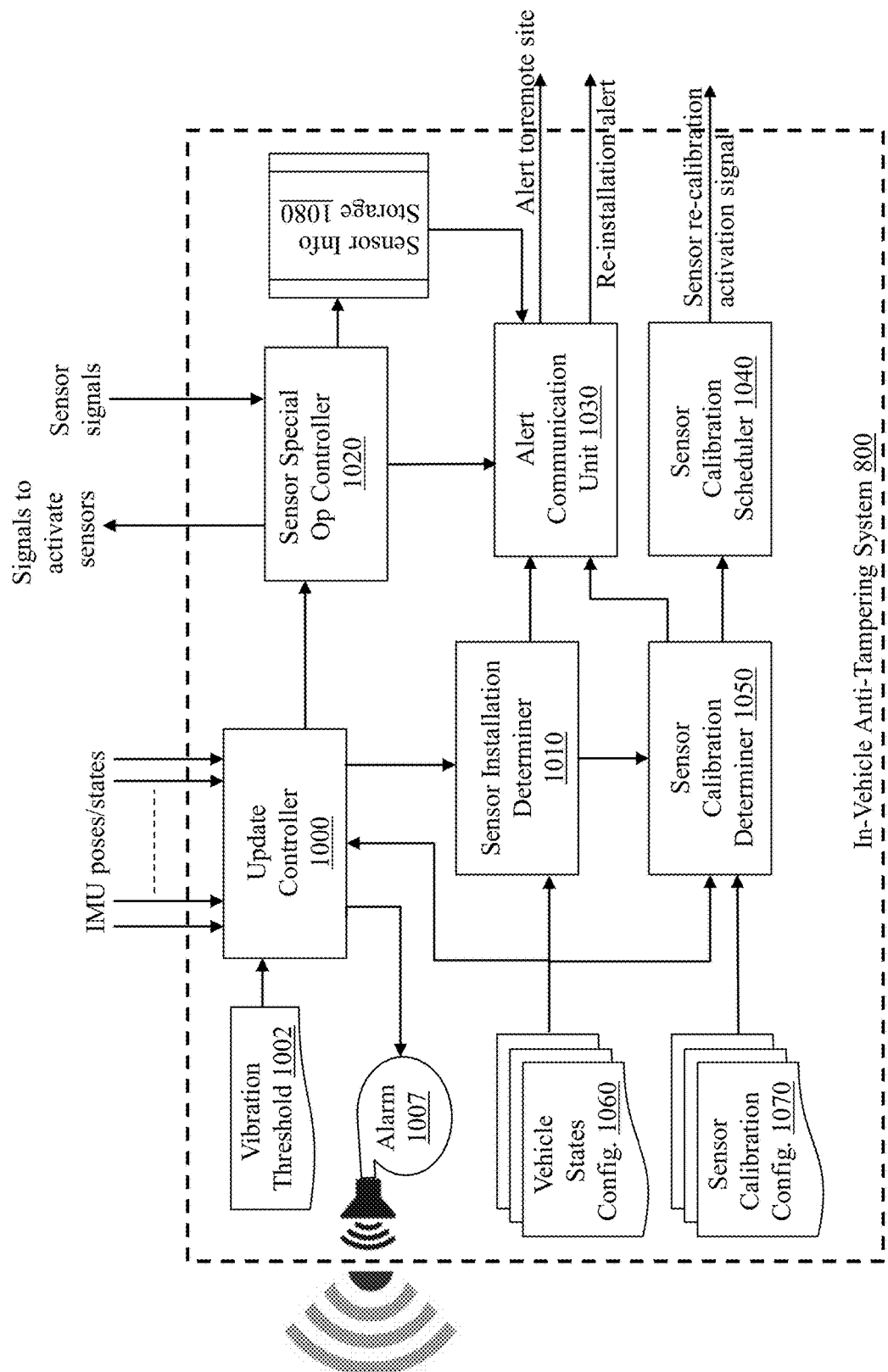
FIG. 10A depicts an exemplary high level system diagram of an in-vehicle anti-tampering system, in accordance with an embodiment of the present teaching.

FIG. 10A depicts an exemplary high level system diagram of the in-vehicle anti-tampering system 800, in accordance with an embodiment of the present teaching. As discussed herein, the in-vehicle anti-tampering system 800 may be deployed inside of the vehicle and is configured to interface with the IMUs to receive detected information related to vibration/pose/state sensed by the IMUs and then determine whether there is a tampering event based on the received information. If the in-vehicle anti-tampering system 800 estimates an on-going tampering event, the in-vehicle anti-tampering system 800 may then trigger an alarm to create a loud siren sound, activate sensors useful to gather/store observations from sensors around the IMUs whose reported data led to the determination of a tampering event, and/or forward an alert about the sensed tampering event and observed surrounding information from the activated sensors to a remote location (e.g., an owner of the vehicle or a fleet control center).

Figure 10B:
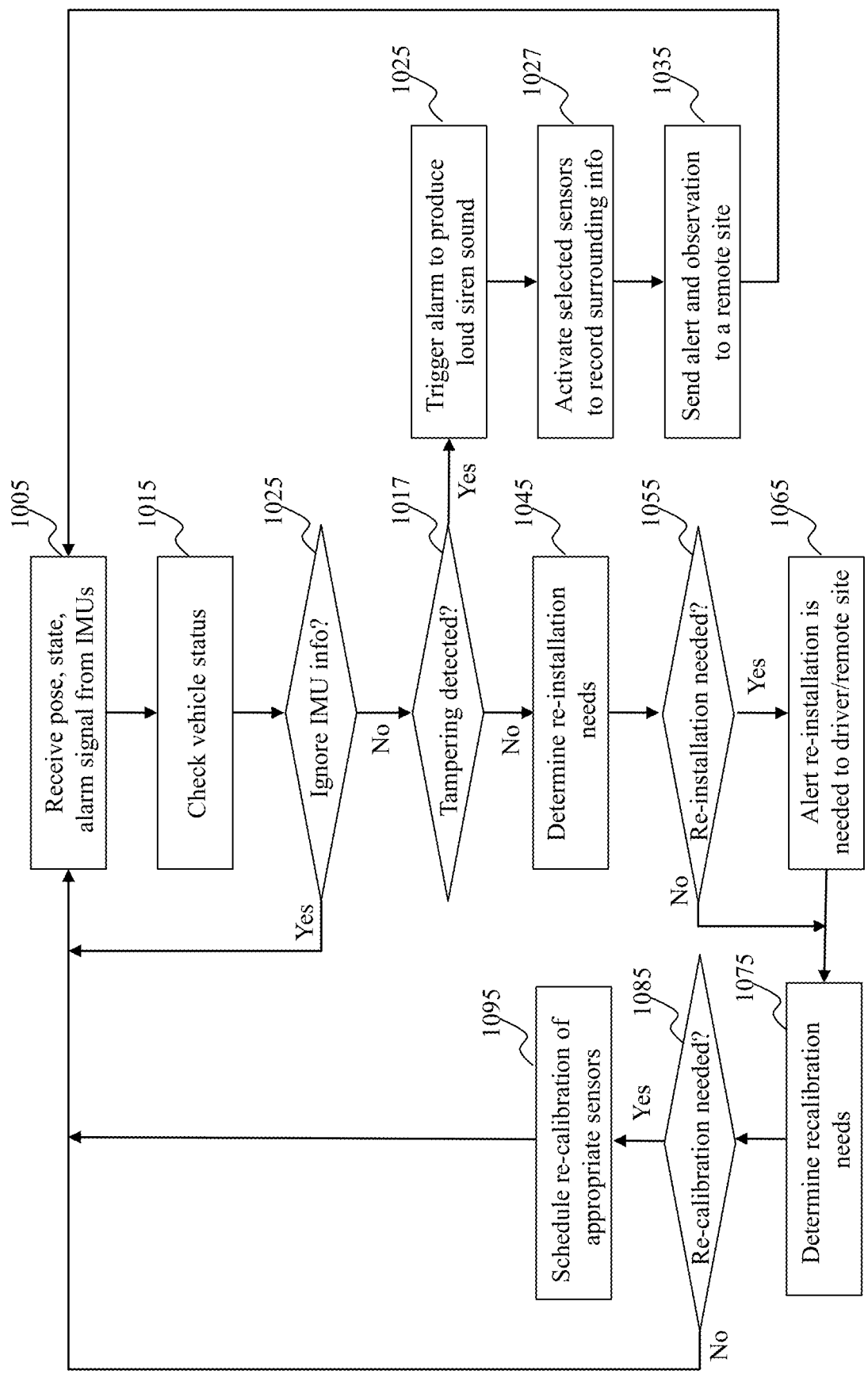
FIG. 10B is a flowchart of an exemplary process of an in-vehicle anti-tampering system, in accordance with an embodiment of the present teaching.

To achieve the needed functionalities, the in-vehicle anti-tampering system 800 comprises an update controller 1000, a sensor special operation controller 1020, an alert communication unit 1030, a sensor installation determiner 1010, a sensor calibration determiner 1050, and a sensor calibration scheduler 1040. FIG. 10B is a flowchart of an exemplary process of the in-vehicle anti-tampering system 800, in accordance with an embodiment of the present teaching. In operation, the update controller 1000 first receives, at 1005, IMU readings from all IMUs. To detects any event, the update controller 1000 may check, at 1015, the vehicle state information stored in 1060. Such stored information may include various information regarding the status of the vehicle (e.g., whether it is currently in motion or not, speed of the motion, etc.), the configuration that governs the functions of the in-vehicle anti-tampering system 800. In some embodiments, via such configuration information, the in-vehicle anti-tampering system 800 may be configured in such a way that whenever the vehicle is in motion, the IMU readings may be ignored, e.g., based on an assumption that when the vehicle is in motion, there cannot be any tampering activities. In some embodiments, an alternative configuration may also be provided to allow the in-vehicle anti-tampering system 800 to continue, even when the vehicle is in motion, monitor the IMU readings to detect different events caused by tampering and disposition of any sensor that may warrant alarm, re-installation, or re-calibration of certain sensors.

If the configuration indicates that the update controller 1000 is to ignore the IMU readings, the process loops back to step 1005 to continue to receive IMU readings from IMUs and check whether such received data should be further processed. When the IMU data need to be processed (or not ignored), determined at 1025, the update controller 1000 compares the received vibration information associated with each sensor to which an IMU is attached with the vibration threshold stored in 1002 and determine, at 1017, whether there is a tampering event directed to the sensor. As discussed herein, such vibration threshold may be pre-set, either as a static parameter or as an adaptively adjustable based on the dynamic situations. For example, when the vehicle is in motion, the threshold may be set higher and when the vehicle is in a parking state, the threshold may be set low so that a slight vibration of an IMU associated with a sensor or a sensor rack may be detected as a tampering event.

When the vibration level reported by an IMU associated with a sensor exceeds the vibration threshold 1002, the update controller 1000 may trigger an alarm 1007 at 1025 to generate some loud siren sound. In addition, the update controller 1000 may also invoke the sensor special operation controller 1020 to activate, at 1027, appropriate sensors selected to start to record their respective surround information. The sensors selected to record the information surrounding the sensor that is considering being tampered with may correspond to those that can be used to capture relevant information (visual, acoustic, etc.) associated with the tampering event. To identify such sensors, the sensor special operation controller 1020 may access the sensor configuration information stored in a sensor information storage 1080 to determine physically nearby sensors, nature of each of such adjacent sensors, fields of view of such sensors, etc. and select appropriate ones for recording the surrounding information.

Based on the selected sensors, the sensor special operation controller 1020 sends activation signals to the selected sensors, receives the sensing signals from such sensors, and provides the received sensed information to the alert communication unit 1030. When the vehicle is in a parking state, normally sensors are turned off without actively recording the surrounding information. In the mode of operation being discussed herein, when a tampering event is detected, various sensors around the detected tampering location may be activated in the manner as described to capture multi-modal sensor data associated with the tampering event. Such captured surround information may be stored in the in-vehicle anti-tampering system 800 (not shown) or be sent, at 1035, to a remote location to preserve the evidence. The recorded information may be sent together with an alert to the remote location, which can be a communication device of a driver of the vehicle or a remote control center that is responsible for monitoring the operation of the vehicle (e.g., a truck fleet).

When there is no tampering event detected, determined at 1017, the IMU readings may be used to detect other maintenance related needs. As discussed herein, IMU data associated with sensors may be used by the sensor installation determiner 1010 and the sensor calibration determiner 1050, at 1045 and 1075 respectively, to determine whether re-installation or re-calibration is needed. In some embodiments, re-installation may be warranted when the disposition of the pose of a sensor is relatively severe which may render the sensor unreliable. The sensor installation determiner 1010 may determine, at 1055, whether a re-installation is needed based on the vehicle state information from 1060. For instance, if the vehicle is moving at a high speed and a LiDAR sensor in front of the vehicle is severely dislocated (e.g., due to the bumpy road condition), this situation may cause serious safety concern if the vehicle is being operated in an autonomous mode. In this case, once the sensor installation determiner 1010 detects the situation, it may immediately invoke the alert communication unit 1030 to alert, at 1065, the driver so that the driver may switch to a manual drive mode, stop the vehicle to re-install the sensor.

If no re-installation is needed, the sensor calibration determiner 1050 determines, at 1075, whether any of the sensors associated with the IMU readings requires re-calibration. Such a determination may be made based on information related to calibration states recorded in 1070. For instance, if a pair of stereo cameras had been previously calibrated to develop a transformation matrix and the calibration assumptions and camera positions may be also recorded, e.g., the assumption may be that the two cameras are assumed to be horizontal and recorded also may include the poses of the two cameras. When the in-vehicle anti-tampering system 800 receives information from IMUS, it may compare the reported poses of the cameras with the recorded poses to see, e.g., whether the assumption of horizontal alignment is still true, etc. If the current poses indicate that the two stereo cameras are no longer horizontally aligned, the previously calibrated transformation matrix is no longer suitable in estimating the depth based on two images acquired by the two stereo cameras. In this case, re-calibration of the stereo cameras may be needed to adjust the transformation matrix given the current poses of the cameras. TO do so, the sensor calibration determiner 1050 may invoke the sensor calibration scheduler 1040 to schedule, at 1095, an upcoming task for re-calibrating the sensors at issue.

In some embodiments, re-calibration may be performed on-the-fly while the vehicle is in motion. In some embodiments, re-calibration may need to be performed offline while the vehicle is not in motion. A schedule for a re-calibration may be set according to the urgency of the issue. For instance, if a pose deviation is large and/or the sensor at issue is of importance in autonomous driving, the re-calibration may be scheduled to be performed in a short time. For any sensors, if on-the-fly re-calibration is not available and the vehicle is in motion, the sensor calibration determiner 1050 may also invoke the alert communication unit 1030 to send an alert to an appropriate party such as the driver or a remote monitoring center (not shown in FIG. 10B).

Via the IMUs and the in-vehicle anti-tampering system 800, a tampering event can be detected, alarmed, and reported. At the same time, the detection of such an event may trigger sensors to record the information surround the event, providing useful evidence associated with the tampering. In addition, IMU readings may also be utilized to detect the needs for making adjustment to the sensors that have been detected as misaligned due to whatever reason. Detection of such needs may be crucial to ensure proper operation of sensors in an any autonomous vehicle and is a key to safety.

There may be other aspects of the sensors in addition to their installation and proper poses that may impact the operation of the sensors and, hence, the safe operation of an autonomous vehicle. For example, sensors are usually installed in the open air and are subject to wind, dust, debris, or other issues caused by the environment and/or wear and tear. Certain types of sensors may be more vulnerable to such environment related issues. For instance, if raindrops exist on the lens of a camera, it prevents the camera from getting a truthful picture of the scene in its field of view. Debris deposited on the lens of a camera will create the same problem. Even without such deposits on the lens, exposing a camera in the open air for an extended period of time may also allow enough accumulation of dusts on the lens, affecting the ability of sensing the accurate information in the field of view.

Figure 11A:
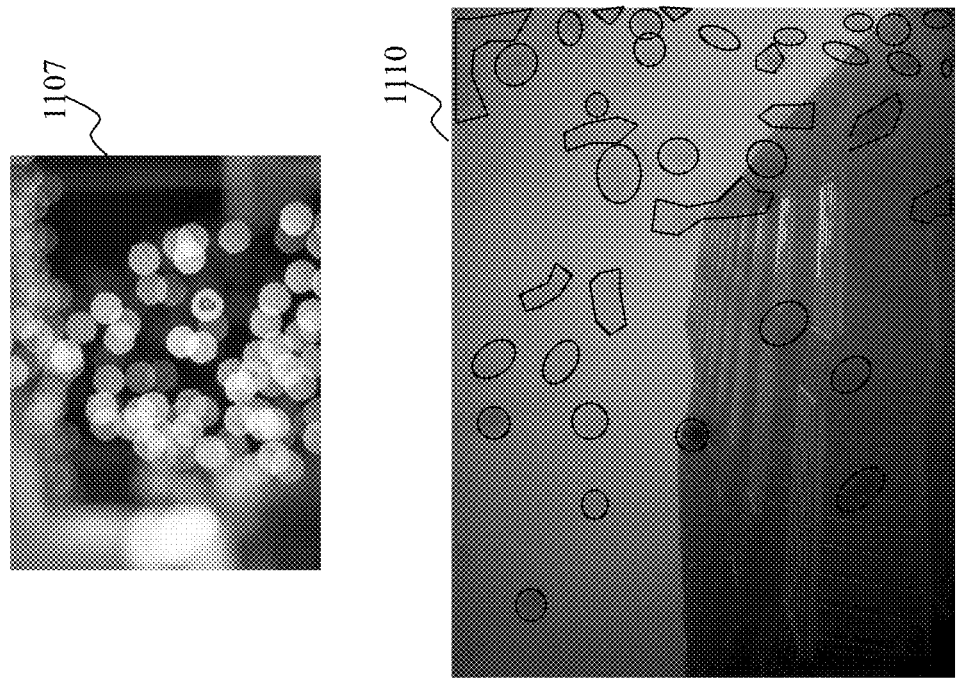
FIG. 11A shows a camera lens with dirt or debris thereon and the resultant images with misleading information.
Figure 11A:
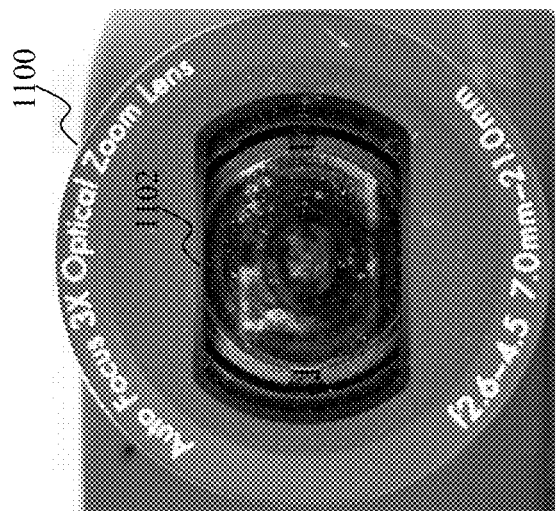

FIG. 11A shows a camera 1110 with lens 1102 having environment induced objects deposited thereon and the resultant images. As seen, camera lens 1102 is shimmered with environment particles that prevent the camera from capturing accurate information. Image 1107 illustrates one example image acquired by camera 1110, where the acquired image includes many round sub-objects likely corresponding to debris deposited on the lens 1102 that effectively block the view of the scene that is intended to be captured using camera 1110. Image 1110 is another exemplary image acquired by camera 1100. As seen from the image 1110, there are various seemingly spurious objects identified by detected edges from the image. Such spurious objects may correspond to, e.g., rain drops deposited on the lens of the camera. In some situations, some events such as light/sun glare may also cause degradation in images.

In some situations, a sensor such as a camera may be enclosed in a housing so that the lens of the camera are not subject to different undesired objects/events. However, a medium through which a camera senses visual information, e.g., a transparent cover on the housing in front of the lens of the camera may still be impacted by the environment because such undesired objects/events may still occur on the transparent cover. The spurious objects/events from the environment as appeared in an image of a scene acquired by the camera may be detected from the image using various known signal processing techniques, such as a combination of edge detection, texture analysis, artificial intelligence (AI) based inference/reasoning/learning algorithms. In using AI based techniques, heuristics may be applied to define characteristics of different types of spurious objects/events to facilitate the detection of such spurious objects/events that are present in sensor data likely due to negative environmental impact and, hence, represent degradation of the acquired image.

Through such processing, degradation in images may be identified and, in some situations, the detected degradation information may also be used to estimate the cause of the degradation. For example, if many small sub-objects are detected persistently in multiple frames of pictures even though other objects underwent different motions (e.g., other cars on the road, buildings passed by, etc.), it may be estimated that such sub-objects may correspond to environment deposits on camera lens or on a cover thereof. The issue with such degraded images is that it prevents an autonomous vehicle from getting a true representation of its surrounding, inhibit its ability to make safe and reliable auto driving decisions. Thus, a mechanism is needed for protecting sensors or sensor racks from such environment related impact.

Figure 11B:
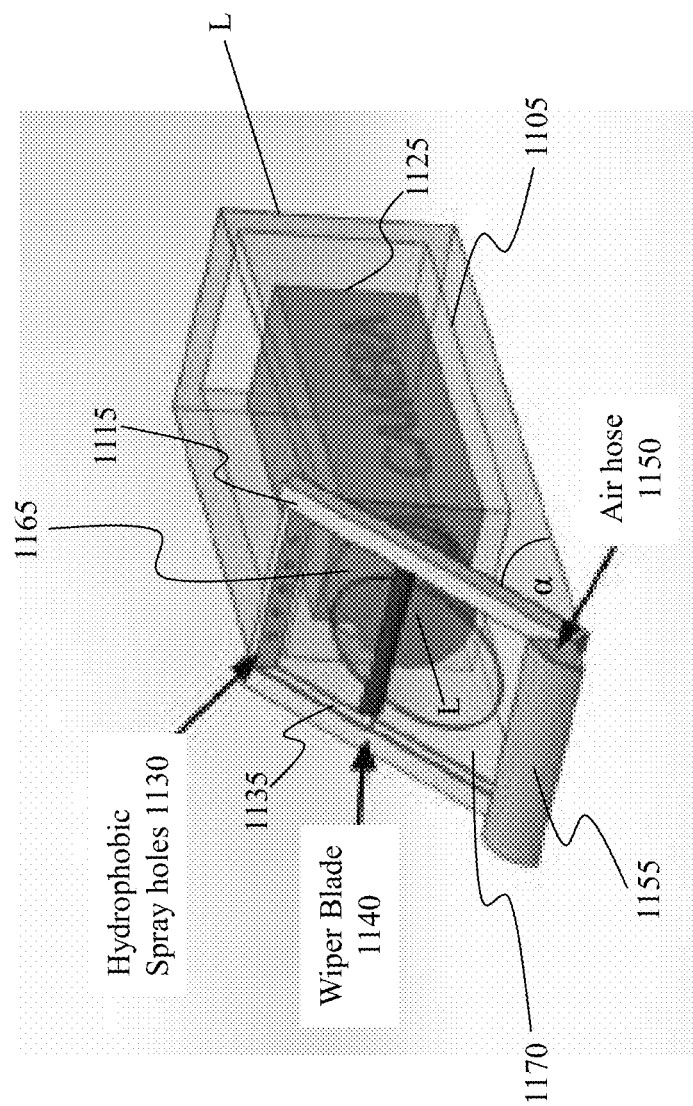
FIG. 11B shows an exemplary environment-proof sensor housing assembly, in accordance with an embodiment of the present teaching.

FIGS. 11B-11F show different aspects of an environment-proof sensor housing assembly, in accordance with an embodiment of the present teaching. FIG. 11B depicts an exemplary environment-proof sensor housing assembly 1120 with means incorporated thereon for protecting a sensor housed therein (optionally in its own housing placed in the assembly 1120) from negative impact from the environment, in accordance with an embodiment of the present invention. In this illustrated embodiment, the environment-proof sensor housing assembly 1120 comprises 6 sides with one side being a slanted surface 1170 as depicted in more detail in FIG. 11B. The slanted surface 1170 of the housing serves as a window to the sensor inside of the environment-proof sensor housing assembly 1120. For instance, if the sensor is a camera 1125, the lens of the camera "sees" the scene in the field of view through the slanted surface 1170 and gather visual information about the scene. For that purpose, the slanted surface 1170 may be made of a transparent material to allow the camera to see through.

The slanted surface 1170 may be provided at an angle relative to a longitudinal axis L-L of the housing assembly 1120, in accordance with an embodiment. In one embodiment, the slanted surface 1170 may be provided at an acute angle α relative to the longitudinal axis L-L and/or a plane or surface (e.g., bottom surface of housing assembly 1120) that runs parallel to longitudinal axis L-L. In this configuration, for example, the slanted surface 1170 may make it more difficult for undesired objects deposited thereon to remain. In another embodiment, the slanted surface 1170 may be provided at an obtuse angle relative to the longitudinal axis L-L and/or a plane or surface (e.g., bottom surface of housing assembly 1120) that runs parallel to longitudinal axis L-L. In yet another embodiment, the slanted surface 1170 may be provided at a right angle or substantially perpendicular to the longitudinal axis L-L and/or a plane or surface (e.g., bottom surface of housing assembly 1120) that runs parallel to longitudinal axis L-L.

Inside the environment-proof sensor housing assembly 1120, there may be an additional interior housing 1105, in accordance with an embodiment. The interior housing 1105 may be where a sensor such as a camera resides in the assembly. In an embodiment, the interior housing 1105 may be embedded within the housing assembly 1120. In one embodiment, the interior housing 1105 may be in the form of a rectangular prism having a longitudinal axis along axis L-L. In an embodiment, the housing assembly 1120 may be in the form of a trapezoid prism, wherein its longitudinal axis L-L is parallel to the longitudinal axis of the interior housing 1105 (or vice versa).

Figure 11C:
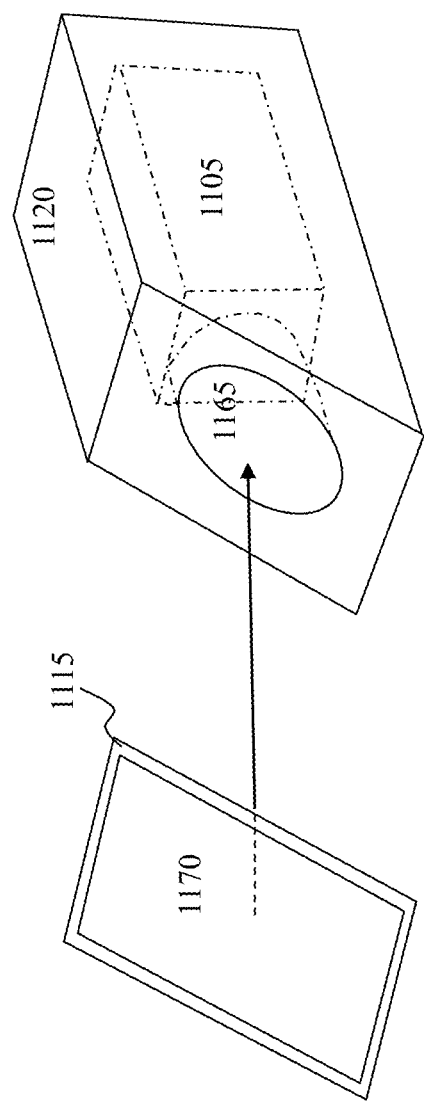
FIGS. 11C-11F shows different aspects of an environment-proof sensor housing assembly, in accordance with an embodiment of the present teaching.
Figure 11E:
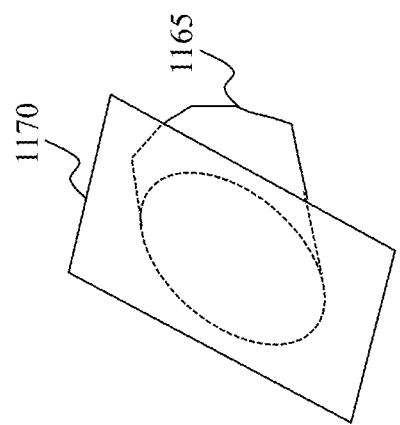
Figure 11D:
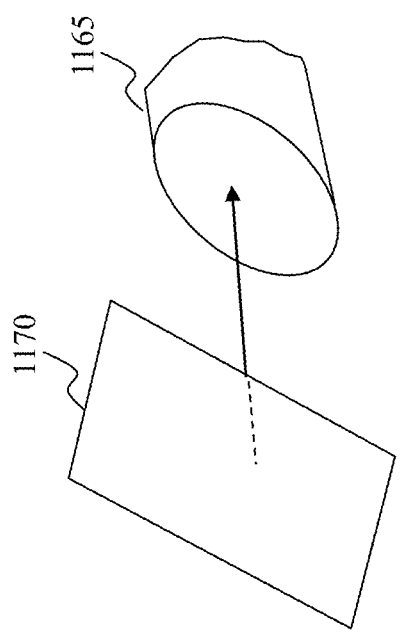
Figure 11F:
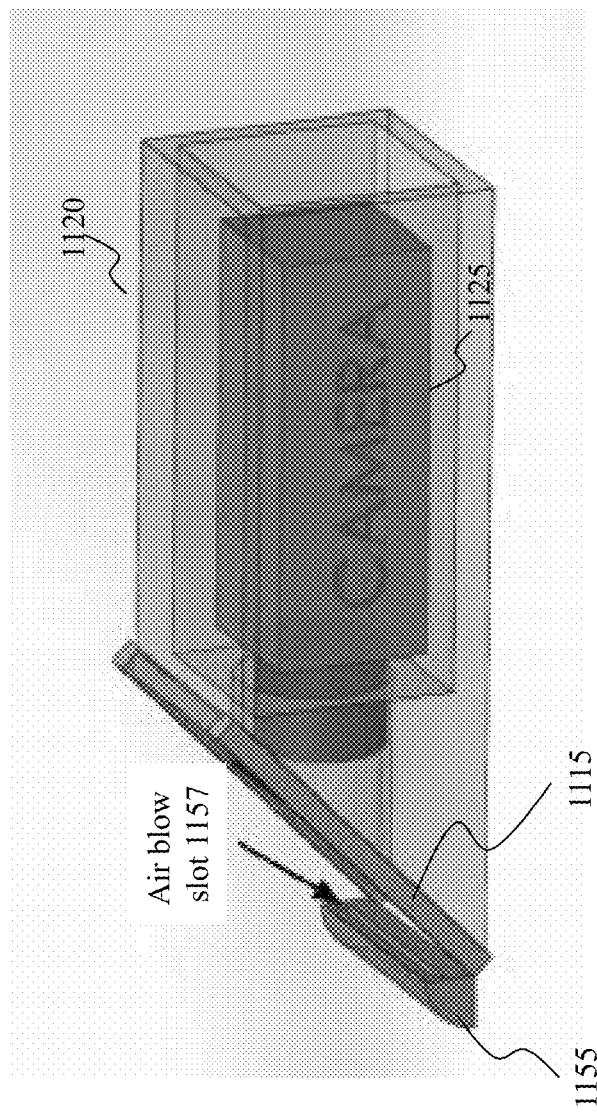

Additionally, in accordance with an embodiment, a protruded portion 1165 may be provided that extends between the interior housing 1105 and the housing assembly 1120. The protruded portion 1165 also has a longitudinal axis parallel to the longitudinal axis L-L. The protruded portion 1165 interfaces with the slanted surface 1170, as shown in FIGS. 11C-11E. The protruded portion 1165 may be in the form of a tube that truncates or ends at the interface with the slanted surface 1170. One end of the protruded portion 1165 is firmly connected with the additional interior housing 1105 and the other end of the protruded portion 1165 may be open with a slanted cross section. The slanted cross section has a same angle as that of the slanted surface 1170 so that the two can meet (see FIGS. 11D-11E) to form a combined closed construct as illustrated in FIGS. 11B and 11F. In this illustrated embodiment, the slanted surface 1170 corresponds to a front side of the housing assembly 1120 that meets the cross section of the protruded portion 1165 and has the norm of the cross section. In one embodiment, the sensor is a camera with its lens facing the cross section of the protruded portion 1165 so that visual information is sensed by the camera through the transparent slanted surface 1170 of the housing assembly 1120.

Around the slanted surface 1170, there may be a frame-like structure 1115 (in both FIGS. 11B and 11C) on which one or more mechanisms or devices may be deployed to enable different means to clean the slanted surface 1170. Each mechanism or device may be associated with a designated cleaning task. The one or more mechanisms may be individually or jointly activated as needed to clean the slanted surface 1170 in order to prevent degradation in the information sensed by the sensor. In some embodiments, the one or more mechanisms or devices may include a fluid cleaning device, a wiper assembly, and an air blower assembly.

In the illustrated embodiment as shown in FIG. 11B, at the top of the frame-like structure 1115, there are horizontally and evenly spaced hydrophobic spray holes 1130 which allow cleaning fluid to flow out of the holes and down along the slanted surface 1170 to wash clean the slanted surface 1170. The spray holes may be connected to some fluid reservoir or tank (see FIG. 12A) to which pressure may be applied to control fluid dynamics. Connected with each of the spray holes, there may also be one or more valves, each of which may be controlled to open, partial open, or close to allow fluid to flow out of the spray holes.

Figure 12A:
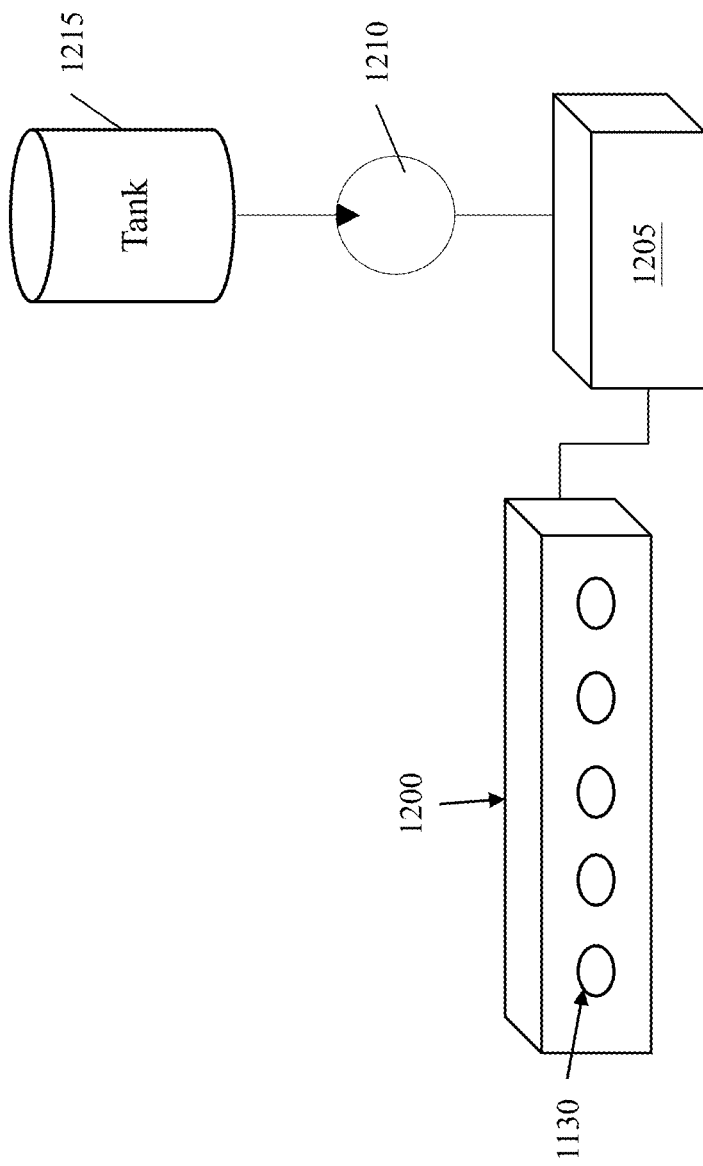
FIG. 12A illustrates an exemplary embodiment for delivering or spraying a cleaning fluid to part of the housing assembly, in accordance with an embodiment of the present teaching.

FIG. 12A illustrates an example embodiment for delivering or spraying a cleaning fluid to slanted surface 1170 using a fluid cleaning device, to remove debris and/or particles therefrom. As shown, the spray holes 1130 may be part of a spray manifold 1200. That is, the fluid cleaning device comprises spray manifold 1200, spray holes 1130, and a source 1215 of cleaning fluid, such that cleaning fluid is delivered from the source 1215 to the slanted surface 1170 via the manifold 1200 and spray holes 1130. The spray holes deliver or spray the cleaning fluid, such as a hydrophobic fluid or liquid, to the slanted surface 1170. Manifold 1200 may be a body that has a passage therein that is adapted to receive cleaning fluid (from a source, e.g., tank 1215) for delivery (simultaneously) to the spray holes 1130, for output of the cleaning fluid. Connected to the manifold 1200 is an optional delivery device 1205 configured to deliver cleaning fluid from a source (e.g., reservoir or tank 1215) to the manifold 1200. Delivery device 1205 may be in the form of a structure positioned on the housing assembly 1120, like a conduit, a tube, a pipe, or a hose, for example, and is not intended to be limiting.

The source, reservoir, or tank 1215 is a container configured to store cleaning fluid or washer fluid, such as a hydrophobic fluid or liquid or other type of cleaning fluid. An optional pump 1210 may be connected to the tank 1215 and to the (optional) delivery device 1205. The pump 1210 may be adapted to pump the cleaning fluid from the tank 1215 and supply the cleaning fluid to the delivery device 1205 (optional) and the manifold 1200 and its spray holes 1130. In an embodiment, the pump 1210 may be designed to pressurize the cleaning fluid for output from the manifold 1200 and holes 1130. A controller 1330 (see FIG. 13A) may be implemented to initiate or drive the pump 1210 (and/or fluid cleaning device) in response to an input command signal (e.g., based on sensed information (such as visual information observed by a camera residing in the environment-proof sensor housing assembly 1120) that is sent to the sensing quality control unit 1310 for sensing quality assessment, as described in greater detail below), thus causing the pump 1210 to pull fluid from tank 1215, pressurize it, and output pressurized cleaning fluid through the delivery device 1205 (e.g., conduit) (if applicable), and through the spray holes 1130 of the manifold 1200 to the slanted surface 1170.

In an embodiment, as previously mentioned, each of the spray holes 1130 may have a valve or a nozzle (not shown) associated therewith. Each nozzle may be configured such that its output opening is aimed towards the slanted surface 1170. When cleaning fluid is pumped into the passage of the manifold 1200, it may be pushed to each nozzle and then sprayed from the spray holes 1130 towards and onto the slanted surface 1170.

Referring back to FIG. 11B, along the left vertical side of the frame-like structure 1115, a wiper blade 1140, that is part of a wiper assembly 1220 (see FIG. 12B), may be attached in a manner that the wiper blade is allowed to move up and down along the slanted surface 1170. The wiper blade may be in slight contact or in a very close proximity to the slanted surface so that it the wiper blade moves, any object protruded from the slanted surface 1170 may be wiped off. Such protruded object may correspond to dust, dirt, debris, particle, or any other type of residue deposited on the slanted surface from the environment, and/or cleaning fluid provided on the slanted surface 1170 from the fluid cleaning device. The wiper blade 1140 may be motorized and the motor (see, e.g., 1235 of FIG. 12B, described below) may be controlled to move in either direction along the longitude direction of the slanted surface 1170. A miniature motor may be installed in, on, or near a track 1135 (e.g., embedded inside the left vertical side) of the frame-like structure 1115 and may be controlled to effectuate needed movement of the wiper blade. For example, when cleaning liquid is sprayed out of the hydrophobic spray holes 1130 on the slanted surface 1170 and flows down along the longitude direction of the slanted surface, the movement of the wiper blade 1140 may provide enhanced cleaning of the wetted slanted surface.

Figure 12B:
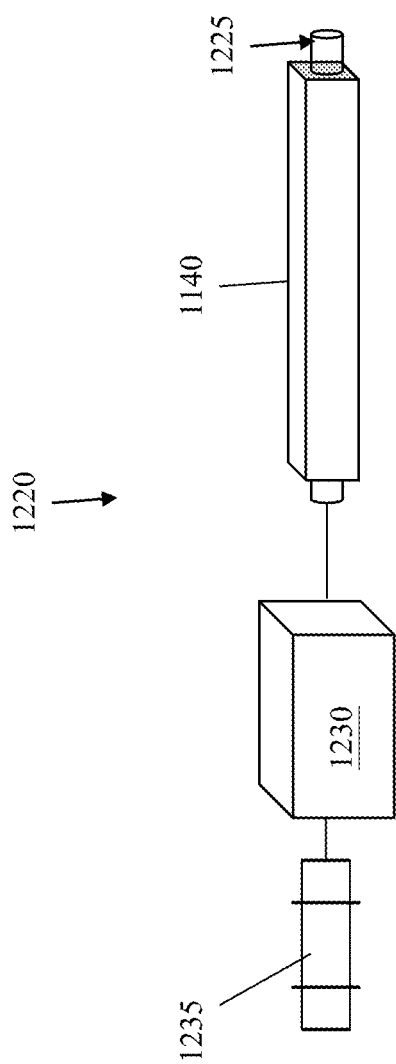
FIG. 12B illustrates an exemplary embodiment of a wiper assembly with a wiper blade for cleaning part of the housing assembly, in accordance with an embodiment of the present teaching.

FIG. 12B illustrates an example embodiment of parts of the wiper assembly 1220 used to clean slanted surface 1170. The wiper assembly 1220 includes wiper blade 1140 provided on a wiper arm 1225, an actuator 1235 (e.g., electric motor), and a transmission system 1230 (optional) for movement, e.g., translational movement, of the wiper arm 1225 and wiper blade 1140. In an embodiment, the wiper blade 1140 is configured to translate or articulate between a bottom and a top of slanted surface 1170 via movement of wiper arm 1225. In an embodiment, the wiper blade assembly 1220 includes a flexible wiper blade 1140 that is mounted on a rigid wiper arm 1225, such that, as the arm 1225 is moved, the flexible wiper blade 1140 is moved (e.g., translated, in up and down direction) across and along slanted surface 1170. Wiper arm 1225 may be connected to transmission system 1230, in accordance with an embodiment. Transmission system 1230 is configured to transmit power from the actuator 1235 into motion and move the wiper assembly 1220. For example, transmission system 1230 may include mechanical mechanisms for moving wiper arm 1225 and thus the blade 1140. In an embodiment, transmission system 1230 includes a transfer device for pushing and pulling the wiper arm 1225 along and/or within track 1135. The ends of the wiper arm 1225 may be inserted into and secured within track 1135, such that the arm 1225 may still be configured to move relative to the track 1135 when pushed or pulled. In another embodiment, transmission system 1230 includes at least one gear mechanism that is configured to be rotated via actuator 1235. For example, such a gear mechanism may be configured for movement along teeth within a track 1135. In yet another embodiment, transmission system 1230 includes a belt and/or pulley system for moving wiper arm 1225 relative to the track 1135. For example, a gear may be utilized to rotate the belt or pulley and move the wiper arm 1225. Accordingly, while examples of transmission parts may be noted here, the type of mechanisms and/or transmission system for moving the wiper arm 1225 within and relative to the track 1135, and thus the wiper blade 1140 along slanted surface 1170, are not intended to be limiting. Further, transmission system 1230 need not be provided. In one embodiment, the actuator or motor 1235 may be connected to the wiper arm 1224 and blade 1140.

Controller 1340 (see FIG. 13A) may be implemented to initiate or drive the wiper assembly 1220 in response to an input command signal (e.g., based on detection of implementation of/delivery of fluid from the fluid cleaning device, and/or based on sensed information sent to the sensing quality control unit 1310 for sensing quality assessment, described in greater detail below), thus causing the wiper arm 1225 to translate or articulate between a bottom and a top of slanted surface 1170. In one embodiment, the wiper assembly 1220 may be controlled along with use of the spray manifold 1200; e.g., the wiper arm 1225 may be utilized during and/or after cleaning fluid is sprayed onto slanted surface 1170.

In accordance with another embodiment, the wiper arm 1225 and blade 1140 are configured to articulate about a pivot point, much like a standard windshield wiper system for a vehicle windshield. For example, a motor or actuator 1235 may be connected to the wiper arm 1225 which is configured for reciprocation or oscillation about a pivot point (e.g., at a center point) along track 1135. The arm 1225 may be connected to a rotatable shaft at said pivot point and may be configured to rotate about its pivot axis to thus pivot wiper arm 1225 back and forth between two positions.

Figure 12C:
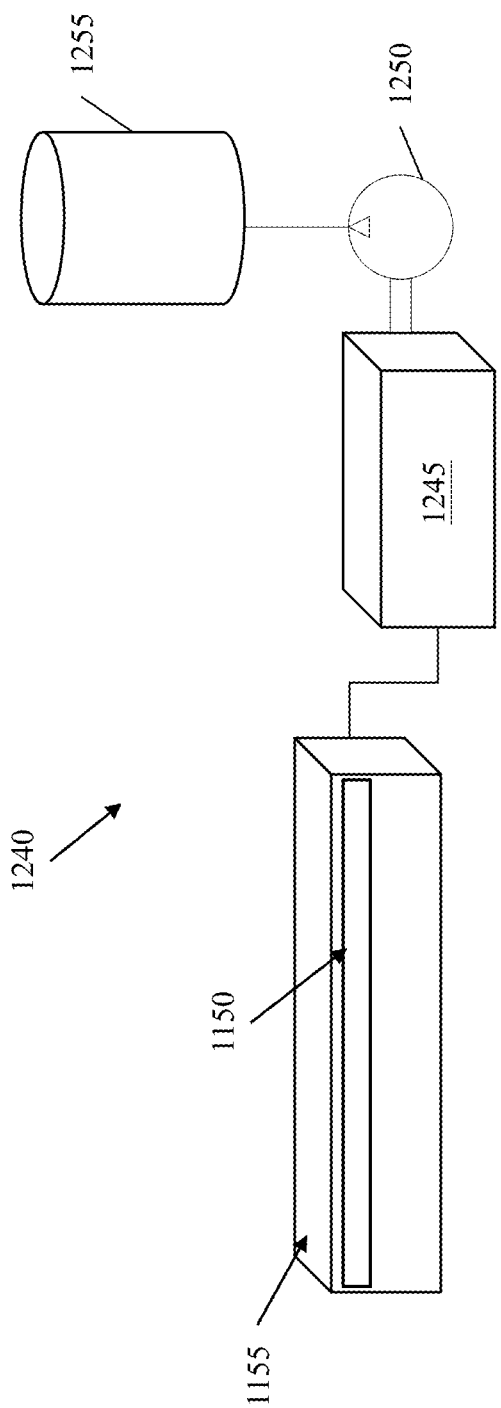
FIG. 12C illustrates an exemplary embodiment for delivering air, via an air blower assembly with an air hose, to part of the housing assembly, in accordance with an embodiment of the present teaching.

In addition to the spray holes 1130 and the wiper blade 1140, an additional mechanism to clean the slanted surface 1170 may be introduced. For example, as seen in FIG. 11B, an air hose 1150, which is part of an air blower assembly 1240 (see FIG. 12C), may also be attached to the frame-like structure 1115 to enable the operation of blowing off solid deposits (e.g., debris, particles) from the slanted surface 1170. As shown in FIG. 11B, the air hose 1150 is provided at the bottom part of the frame-like structure 1115. Via the air hose, air may be blown from the bottom of the slanted surface 1170 in an upward direction to blow off any undesired debris and residuals deposited on the slanted surface. FIG. 11F illustrates more details associated with the air hose 1150, in accordance with an embodiment of the present teaching. As seen, the air hose 1150 may correspond to a structure 1155 or manifold housing an air blow slot 1157. Manifold or structure 1155 may be a body that has a passage therein that is adapted to receive pressurized air for delivery through air hole 1150 and towards slanted surface 1170. The air hose structure 1155 may be attached to the bottom side of the frame-like structure 1115 and connected to a delivery device (schematically shown in FIG. 12C) that is a conduit of air supply from a supply or source 1255, where the air from the supply may be pressurized when needed to deliver the air at some velocity through the device. Delivery device 1245 may be in the form of a conduit, a tube, a pipe, or a hose, for example, and is not intended to be limiting. The supply or source 1255 may be a container configured to store air, or, alternatively, the air may be sourced from the surrounding environment. An optional compressor 1250 or pump may be connected to the source 1225 and to the delivery device 1245. The compressor 1250 may be adapted to pressurize and pump air from the source 1255 (or environment) and supply the pressurized air to the delivery device 1245 and thus the manifold/structure 1155 and air hole 1150.

An air blow controller 1320 (see FIG. 13A) may be implemented to initiate or drive the compressor 1250 in response to an input command signal (e.g., based on sensed information sent to the sensing quality control unit 1310 for sensing quality assessment, which is described in greater detail below), thus causing the compressor 1250 to pressurize the air and output through the delivery device 1245 (e.g., conduit) (if provided), and through the air hole 1150. In an embodiment, each air hole 1150 may be configured such that its output opening is aimed towards the slanted surface 1170, to push debris upwardly and/or outwardly and away from slanted surface 1170. In one embodiment, the air blower assembly 1240 may be initiated to blow air towards the slanted surface 1170 to move cleaning fluid and/or debris therefrom. The air may be used in addition to or in lieu of the wiper assembly 1220, in accordance with an embodiment.

While the drawings depict air blow slot 1157 as part of air hose 1150, it should be noted that number of air holes or slots for delivering pressurized air to the slanted surface 1170 may be provided.

Furthermore, while the drawings and description above refer to the fluid cleaning device and manifold 1200 being provided on top of or above the slanted surface 1170 and the air blower assembly 1240 being on a bottom or below the slanted surface 1170, their locations and described directions are not intended to be limiting. That is, the locations of the manifold 1200 and air blower assembly 1240 may be switched, i.e., placed at a bottom and placed at a top, respectively, of the slanted surface 1170 of the sensor housing assembly 1120. Accordingly, any description with regards to the fluids (cleaning fluid, air) and their directional movement (e.g., downward, upward) are intended to be exemplary only and not intended to be limiting.

Accordingly, any of the above described cleaning mechanisms may be provided alone or in combination on housing assembly 1120. As such, in addition to providing a sensor housing assembly 1120 on an autonomous vehicle, this disclosure further includes systems for determining negative impact on the at least one sensor using a controller, and activating one or more cleaning devices via the controller in response to the determined negative impact, the one or more cleaning devices being mounted on the sensor housing assembly and configured to assist in cleaning and/or removing debris and/or particles from the sensor housing assembly 1120, and in particular, from the slanted surface 1170.

With the environment-proof sensor housing assembly 1120 with the various cleaning mechanisms deployed thereon, what is cleaned is the slanted surface 1170 of the environment-proof sensor housing assembly 1120 rather than the sensor housed therein. The cleaning operations may be controlled based on, e.g., observed quality issues emerged. More details related to implementation, control, and operation of the cleaning mechanisms described herein will be provided with reference to FIGS. 13A-16B.

Figure 13A:
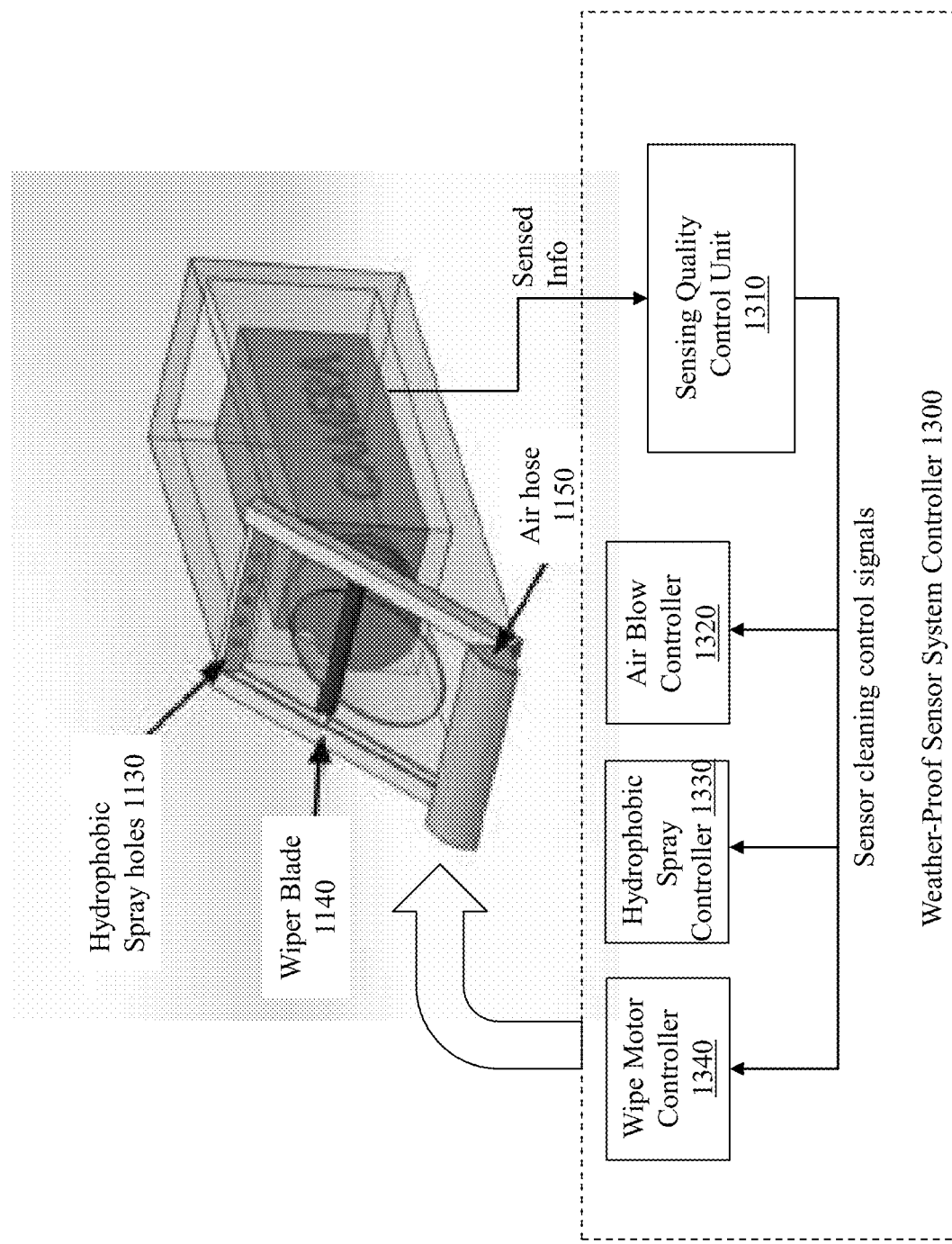
FIG. 13A depicts an exemplary mechanism involving an environment-proof sensor housing assembly and an environment-proof sensor system controller, in accordance with an embodiment of the present teaching.

With alternative implementations of different mechanisms deployed on the environment-proof sensor housing assembly 1120, such mechanisms are controlled to operate when cleaning is needed. In some embodiments, the control of operation may be based on quality of sensed information. For instance, sensed information may be analyzed in terms of sensing quality in order to make a decision whether the slanted surface 1170 needs to be cleaned. FIG. 13A depicts an exemplary embodiment of a system configuration for environment-proof sensing, in accordance with an embodiment of the present teaching. In this exemplary system configuration, a sensor (e.g., a camera) 1125 housed in an environment-proof sensor housing assembly 1120 is connected to environment-proof sensor system controller 1300, which controls the quality of sensing quality of the sensor. In this exemplary embodiment, the environment-proof sensor system controller 1300 comprises a sensing quality control unit 1310, an air blow controller 1320, a hydrophobic spray controller 1330, and a wiper motor controller 1340.

To facilitate environment-proof quality sensing, the sensor provides sensed information (such as visual information observed by a camera residing in the environment-proof sensor housing assembly 1120) to the sensing quality control unit 1310 for sensing quality assessment. Based on the quality of sensed information, the sensing quality control unit 1310 may control to activate one or more controllers related to different cleaning means to clean the slanted surface 1170. For instance, when raindrops are detected in images acquired by a camera residing in the assembly 1120, the sensing quality control unit 1310 may invoke the wipe motor controller 1340 to activate the motor driving the wiper blade 1140 to wipe off the rain drops on the slanted surface 1170. In some situations, the sensing quality control unit 1310 may also activate the hydrophobic spray controller to initiate the hydrophobic spray the cleaning fluid while the wipe is wiping the slanted surface 1170 to enhance the cleaning effect. To achieve that, the hydrophobic spray controller 1130 may control the states of valves associated with the hydrophobic holes and the pressure of the fluid supply. If debris are observed from the images from the camera (e.g., objects consistently detected in different frames without any change or movement), the sensing quality control unit 1310 may invoke the air blow controller 1320 to activate the air hose 1150 to blow off the debris deposited on the slanted surface 1170.

Figure 13B:
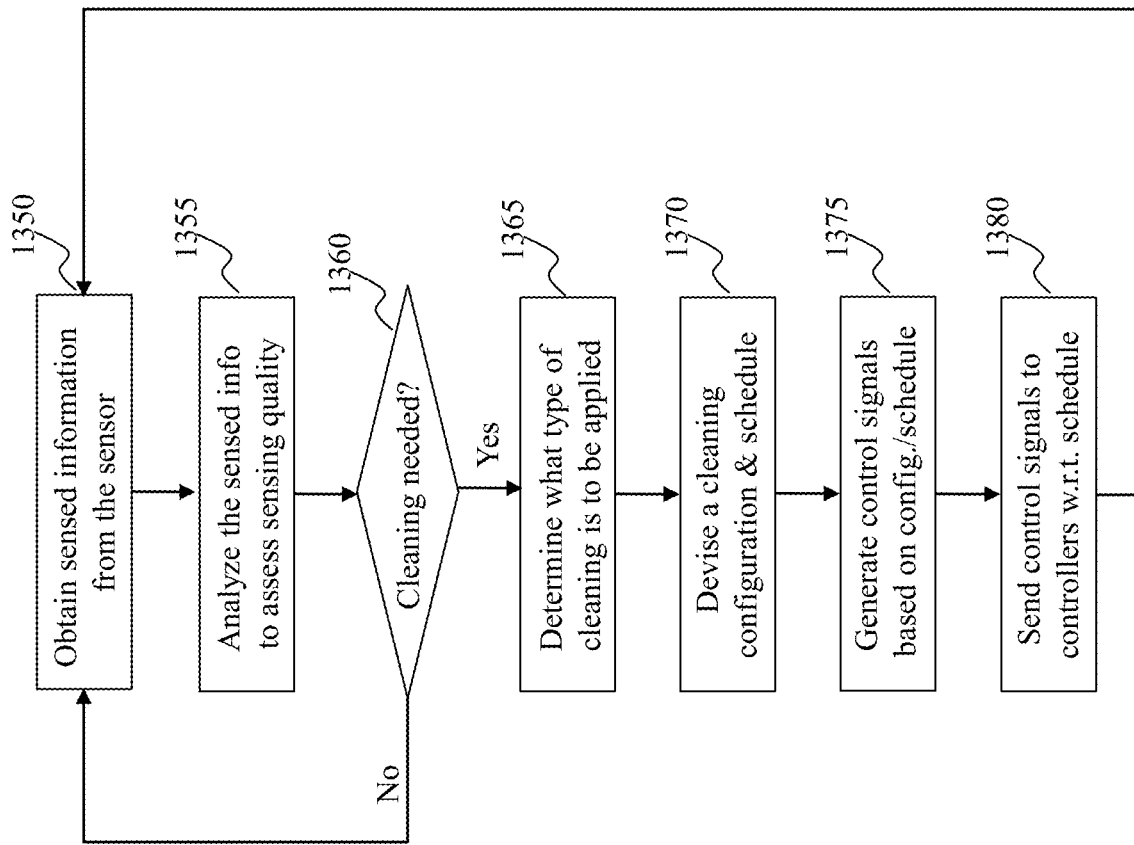
FIG. 13B is a flowchart of an exemplary process of an environment-proof sensor system controller, in accordance with an embodiment of the present teaching.

For operation, the sensing quality control unit 1310 is connected to the air blow controller 1320, the hydrophobic spray controller 1330, and the wipe motor controller 1340 and invokes appropriate controllers in the event that cleaning is warranted. Once invoked, a controller may then control the associated cleaning mechanism to clean the slanted surface 1170. FIG. 13B is a flowchart of an exemplary process of the environment-proof sensor system controller 1300, in accordance with an embodiment of the present teaching. To assess the quality of sensed information, the environment-proof sensor system controller 1300 first receives, at 1350, information sensed by the sensor residing in the housing 1200. The received sensed information is then analyzed at 1355 in order to determine whether the quality of the sensed information warrants a cleaning of the slanted surface 1170. If no cleaning is needed, determined at 1360, the environment-proof sensor system controller 1300 loops back to 1350 to continually receive sensed information from the sensor.

If a cleaning is warranted, determined at 1360, the environment-proof sensor system controller 1300 determines, at 1365, what types of cleaning need to be applied. Such a determination may be made based on the type and severity of quality degradation in the received sensor observations in accordance with some pre-determined rules. For example, if degradation is related to rain drops on the slanted surface, wiping using wiper blade 1140 may solve the problem. If the level or severity of such degradation is significant, the wiper blade 1140 and the hydrophobic spray 1130 may be simultaneously needed. If the degradation seems to be caused by dust/debris deposited on the slanted surface 1170, then the air hose 1150 may be needed to blow off the dust/debris. In some embodiments, subsequent to applying air hose 1150 to blow off dust/debris, additional means to clean the slanted surface may follow because, dust/debris depositions may leave undesirable marks on the surface affecting the quality of observations made through the slanted surface 1170. In some situations, the environment-proof system controller 1300 may first apply the air hose to blow off dust/debris when detected and then monitor whether it satisfactorily remove the degradation without more cleaning. If it further observed that the degradation still exists (even though it may have been reduced via air hose 1150), the environment-proof system controller 1300 may then invoke additional cleaning using either the wiper blade 1140 and/or the hydrophobic spray 1130. So, the control may be set with intelligent decisions made adaptively based on situations.

Depending on the types of cleaning needed to reduce degradation, the environment-proof system controller 1300 may then proceed to devise, at 1370, a cleaning configuration or schedule, e.g., when to apply which cleaning means for how long. Based on the configuration/schedule for applying the needed cleaning, the environment-proof system controller 1300 then generates, at 1375, control signals to implement the cleaning schedule and sends, at 1380, the control signals to the controller(s) responsible for controlling the cleaning means to carry out the scheduled cleaning.

Figure 14A:
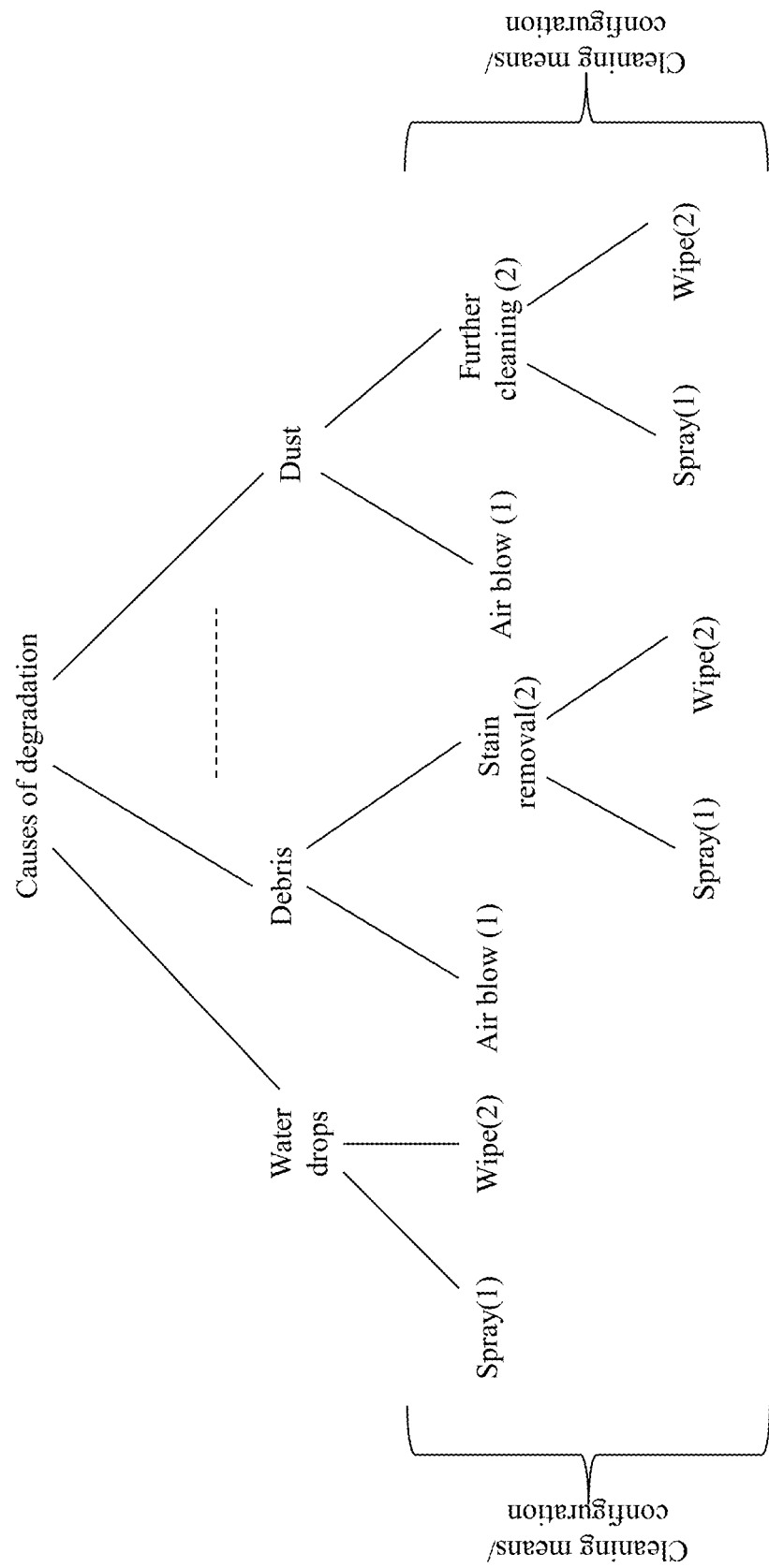
FIG. 14A shows exemplary causes that give rise to a need to clean a sensor assembly and exemplary configurations for such cleaning, in accordance with an embodiment of the present teaching.

FIG. 14A shows exemplary causes that give rise to a need to clean the sensor assembly and exemplary configurations to clean, in accordance with an embodiment of the present teaching. In this illustration, exemplary causes that give rise to a need to clean the slanted surface include rain drops, debris deposited, . . . , and dust accumulation. For each cause, a series of cleaning activities may be configured. For instance, to remove rain drops, there may be two cleaning activities that are configured as step 1 and step 2, where step 1 involves activating the hydrophobic spray 1130 of fluid, and step 2 involves activating the wiper blade 1140 to wipe the wetted surface to remove the rain drops. The two steps may also temporally space with an appropriate delay. Similarly, for remove debris deposited on the slanted surface 1170, the air hose 1150 may be first applied as step 1 to blow off the debris. This may be followed by the second operation to remove the stain(s) on the surface due to the debris, which may include applying the hydrophobic spray as the first sub-step followed by wiping using the wipe blade as the second sub-step of the second operation. The same cleaning steps may also be applied to remove dust, as shown in FIG. 14A.

Figure 14B:
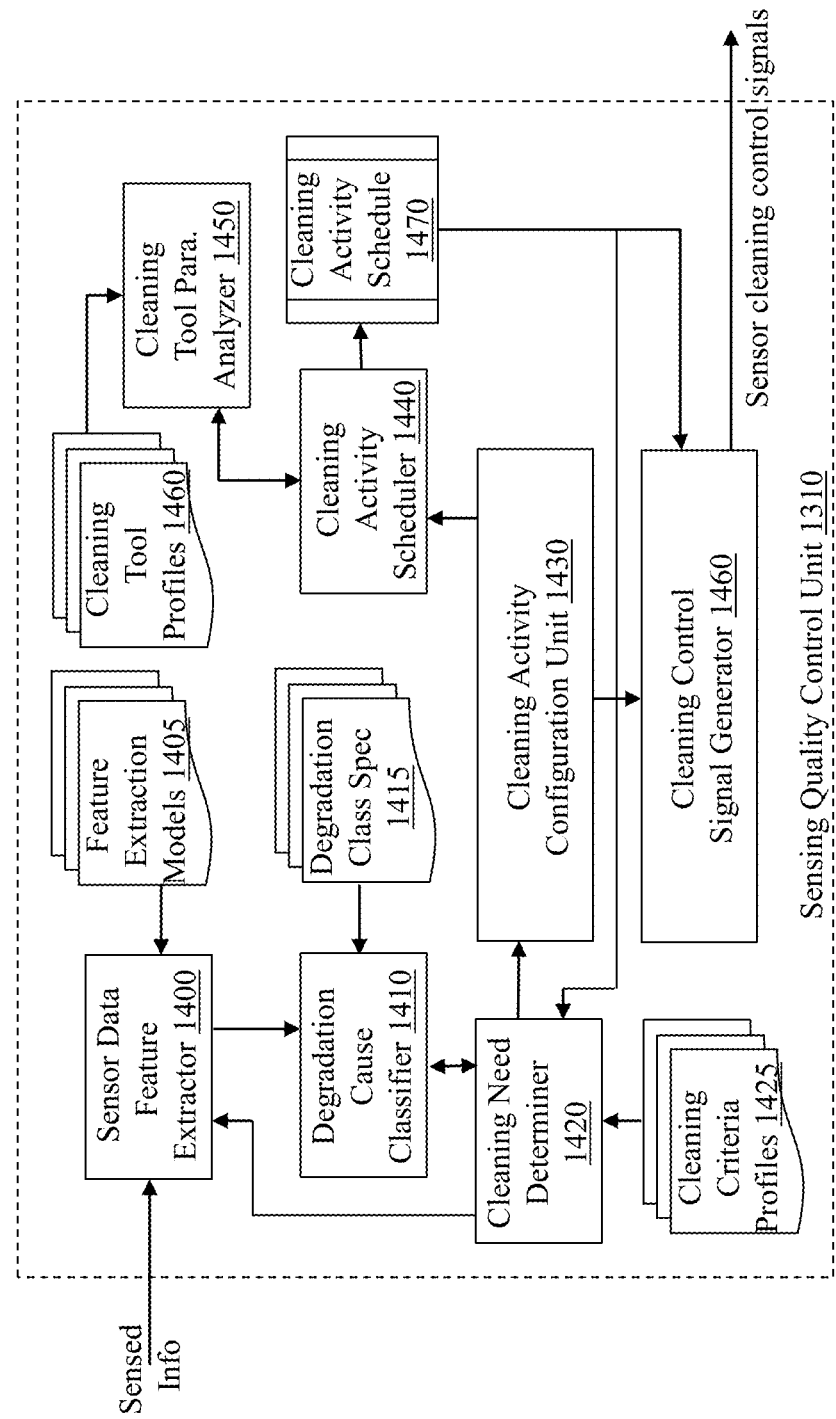
FIG. 14B depicts an exemplary high level system diagram of a sensing quality control unit, in accordance with an embodiment of the present teaching.
Figure 14C:
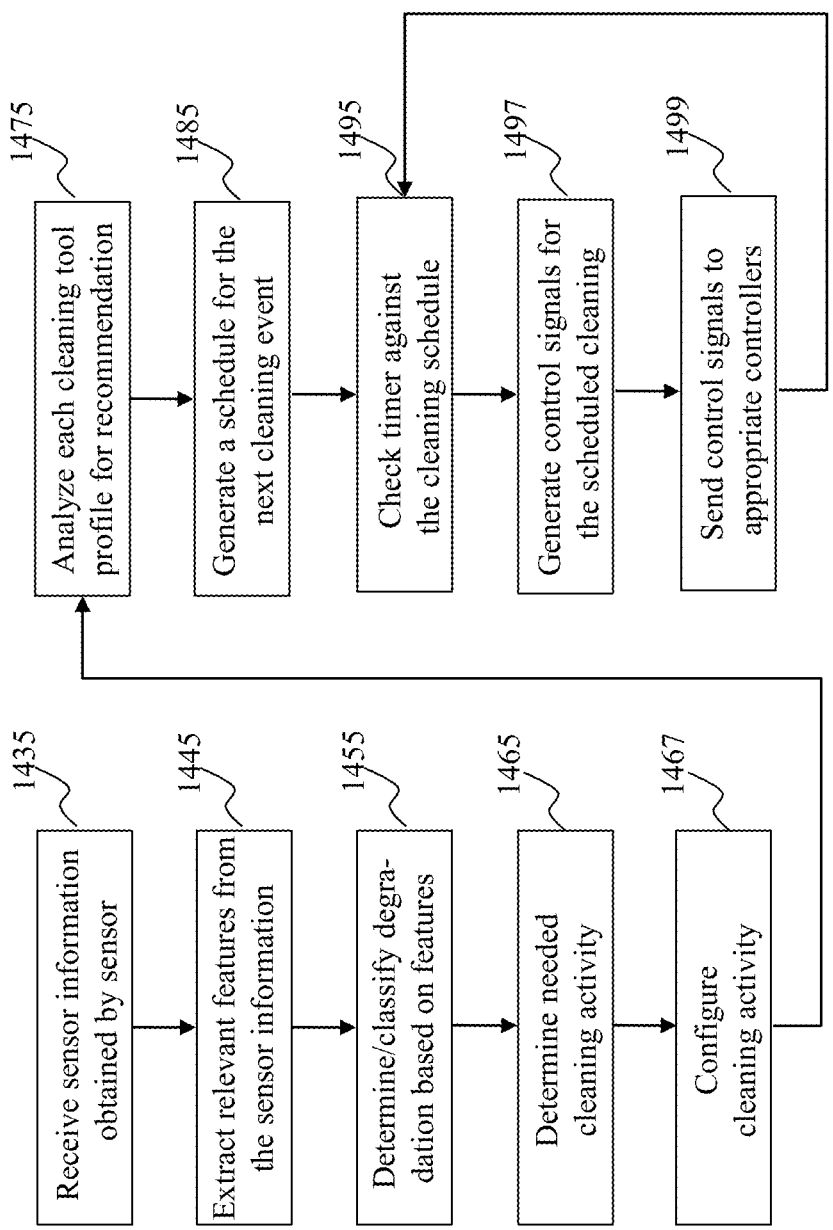
FIG. 14C is a flowchart of an exemplary process of a sensing quality control unit, in accordance with an embodiment of the present teaching.

FIGS. 14B-14C depict exemplary implementation of the environment-proof system controller 1300. FIG. 14B depicts an exemplary high level system diagram of the environment-proof system controller 1300, in accordance with an embodiment of the present teaching. To fulfill the desired functionalities as disclosed herein, the environment-proof system controller 1300 comprises a sensor data feature extractor 1400, a degradation cause classifier 1410, a cleaning need determiner 1420, a cleaning activity configuration unit 1430, a cleaning activity scheduler 1440, a cleaning tool parameter analyzer 1450, and a cleaning control signal generator 1460. FIG. 14C is a flowchart of an exemplary process of the environment-proof system controller 1300, in accordance with an embodiment of the present teaching. Different components disclosed in FIG. 14B that are included in the environment-proof system controller 1300 perform the process as described in FIG. 14C to achieve the functions of applying appropriate cleaning to the environment-proof sensor housing assembly 1120.

In operation, the sensing quality control unit 1310 functions to apply needed cleaning to the environment-proof sensor housing assembly to minimize the negative impact on sensing quality from the environment. It may carry out a procedure to implement the cleaning. For example, it may first detect that such a need exists and then determine what type(s) of cleaning is needed (e.g., wipe or air blow). This may be followed by a determination as to which cleaning tools are to be activated to carry out the needed cleaning. To implement the cleaning, the sensing quality control unit 1310 may also proceed, optionally, to schedule different cleaning activities (e.g., when to apply which cleaning tool for how long) to carry out the cleaning. Finally, to actually control the cleaning tools to carry out the scheduled cleaning, appropriate control signals for different cleaning tools may be generated and used to activate the selected cleaning tools.

There may be different ways to determine that there is a need for cleaning. In some embodiments, cleaning may be carried out routinely according to a schedule. In some embodiments, the need for cleaning may be determined based on the situation. For instance, as discussed herein with respect to FIG. 11A, degradation in acquired images may be detected and a need for cleaning may be determined when the degradation is estimated caused by undesired objects from the environment (e.g., rain drops, small particles, etc.) deposited on the slanted surface. In some embodiments, a mixed mode of operation may also be employed. While there is a pre-determined schedule, dynamically detected degradation may also trigger cleaning. For example, it may be set up that in normal situations, cleaning may be carried out according to a schedule (e.g., every 24 hours when the vehicle is traveling and every week when the vehicle is not traveling). This set up may be put in place in parallel with a dynamic set up by which cleaning may also be triggered whenever degradation is observed and is assessed to be related to deposit of undesired objects on the assembly. In this situation, the dynamically determined cleaning decision trumps the normal schedule so that the assembly may be cleaned promptly when there is a need. In FIG. 14B, the cleaning need determiner 1420 is provided to identify a need for cleaning. As seen, it may retrieve, from a cleaning activity schedule storage 1470, a set up for regular/normal cleaning, and determines, based on, e.g., a reading from a timer, whether a cleaning operation needs to be activated. It may also invoke the sensor data feature extractor 1400 and the degradation cause classifier 1410 to identify possible degradations present in the sensed information and a cause estimated based on, e.g., degradation class specifications stored in 1415. If a cause for detected degradation warrants a cleaning, the cleaning need determiner 1420 may then proceeds to activate the cleaning operation.

When a cleaning decision is to be made based on detected degradation, the cleaning need determiner when the sensor data feature extractor 1400 receives, at 1435, the sensed information from a sensor residing within an environment-proof sensor housing assembly, it extracts, at 1445, relevant features from the sensed information. Relevant features to be extracted may be determined based on the type of sensor that provides the sensed information. For example, if the sensor at issue is a camera, relevant features to be extracted may include edges and features thereof and characteristics of objects such as shapes, sizes, and motions of the respective objects. Such extracted features may be used for assessing possible degradation of the sensed information caused by, e.g., environmental impact. For instance, in detecting edges in an image, features related to the edges may be analyzed and used to determine whether the image is blurred.

Characteristics of an object detected from an image may also be used to determine whether the object corresponds to a real object or a deposit on the slanted surface. If an object is considered not corresponding to an actual object, this object has caused degradation in sensed information and therefore needs to be removed. There may be different ways to determine whether an object is a real object or not. For example, if an object is persistently detected in all frames of a video at the same location with the same shape and size, it is likely a debris on the slanted surface 1170. If such an object is observed to split into multiple pieces that move from frame to frame in a video in different directions inconsistent with known motions of a real object observable in the field of view of an autonomous vehicle, e.g., a rain drop may drip in a vertical direction (rain drops may travel along the slanted surface in the longitude direction), such information may be used to assess whether some objects may correspond to rain drops.

Based on the features extracted from the sensed information, the degradation cause classifier 1410 determines and classifies, at 1455, the degradation and the cause(s) thereof. Accordingly, the cleaning need determiner 1420 determines, at 1465, the needed cleanings based on, e.g., cleaning criteria profiles stored in 1425 (examples of which are provided in FIG. 14A). For the needed cleanings, the cleaning activity configuration unit 1430 generates, at 1467, a configuration for the involved cleaning activities. As shown in FIG. 14A, for reducing the degradation caused by debris, the air hose 1150 is to be applied to physically remove the debris and then followed by the step of stain removal which involves two sub-steps of hydrophobic spray and wiping the slanted surface using the wiper blade 1140. The configuration generated (by the cleaning activity configuration unit 1430) may include a specification of the specific tools to be applied and a time sequence of the applications of different tools.

The configuration generated may then be used by the cleaning activity scheduler 1440 to generate, at 1495, a schedule for the next cleaning event. Such a schedule may be generated based on knowledge of how each of the cleaning means (spray, wipe, and blow) works and parameters associated with the specific means deployed on the environment-proof sensor housing assembly 1120. For example, the time needed for cleaning fluid to drip from the holes to cover the slanted surface may be used to determine how many seconds the hydrophobic spray holes need to be kept on. Such information is stored in a cleaning tool profile storage 1460 and is accessed by the cleaning tool parameter analyzer 1450 to analyze and devise, at 1475, recommendations on how each cleaning tool to be deployed may be activated according to some operational parameters to achieve the intended goal. The recommendations devised by the cleaning tool parameter analyzer 1450 may then be provided to the cleaning activity scheduler 1440 to facilitate it to generate, at 1485, an appropriate schedule specifying how to activate each of the cleaning tools to be invoked to clean.

The cleaning activity schedule derived from the cleaning activity scheduler 1440 may specify a temporal sequence of sub-events, each of which may correspond to an application of one cleaning tool to be used to clean. The schedule may also specify a specific time or duration by which each of the cleaning tools is to be operational. The devised schedule may be stored, upon being generated, in a cleaning activity schedule storage 1470. Each cleaning activity schedule stored in 1470 may be accessed by the cleaning control signal generator 1460 to first optionally check, at 1495, whether it is the scheduled time for cleaning. If so, the cleaning control signal generator 1460 accordingly generates, at 1497, corresponding control signals that can be used to implement the scheduled cleaning activities. Such control signals are then be sent, at 1499, from the cleaning control signal generator 1460 to corresponding controllers that may then control their respective cleaning tools to carry out the scheduled cleaning. This is illustrated in FIG. 13A. To carry out the sub cleaning events in a temporal sequence as scheduled, the control signals may be sent to different controllers at different times according to the schedule to ensure the proper temporal sequence of different cleaning steps.

As an example, to remove debris deposited on the slanted surface 1170, cleaning activities to be applied may involve, as shown in FIG. 14A, blow off the debris, wet the slanted surface 1170, and then wipe the wet slanted surface to clean any stain from the debris. Form such cleaning activities, a configuration may be generated that specifies that air hose 1150 is first applied to blow off the debris, the hydrophobic spray 1130 is secondly applied to wet the slanted surface 1170, and the wiper blade 1140 is last applied to the wet slanted surface to wipe off any stain that the debris may have left. A schedule corresponding to this configuration may specifically instruct a temporal sequence of the events, e.g., to apply the air hose 1150 to blow for 5 seconds, then release the cleaning fluid from the spray hoses 1130 for 3 seconds, finally activate the motor for the wiper blade 1140 at a slow motion for 15 seconds.

According to this schedule, the cleaning control signal generator 1460 may then generate and send different control signals directed to corresponding controllers at different times. With this example, the cleaning control signal generator 1460 may then generate three control signals. The first one is directed to the air blow controller 1320; the second one is directed to the hydrophobic spray controller 1330; the third control signal is directed to the wipe motor controller 1340. The first control signal includes instructions to the air blow controller 1320 to control the air hose to blow for 5 seconds. The second control signal includes instructions to the hydrophobic spray controller 1330 to control the spray holes (and the associated valves and pressure) to release cleaning fluid for 3 seconds. The third control signal includes the instructions to the wipe motor controller 1340 to control the wipe motor to drive the wiper blade 1140 at a certain speed to wipe the slanted surface 1170 for 15 seconds. To control the temporal sequence, the cleaning control signal generator 1460 may send the first control signal out first to the sir blow controller 1320, the second control signal 5 seconds later to the hydrophobic spray controller 1330, and finally the third control signal 3 seconds later to the wipe motor controller 1340.

As discussed herein, in some embodiments, the sensing quality control unit 1310 may alternatively elect a cleaning schedule to be enforced regardless of what the sensed information reveal. For instance, the cleaning activity schedule storage 1470 may store a default cleaning schedule which may specify a fixed interval cleaning schedule, e.g., to perform a sequence of cleaning steps every 2 hours while the vehicle is moving and perform the same sequence of cleaning steps each time upon the vehicle is turn on and start to move. The sensing quality control unit 1310 may be configured to self-execute such a default cleaning schedule in normal situations unless the operational mode is switched to an adaptive cleaning mode where cleaning is only activated when degradation is detected, as discussed above. Steps 1495-1499 form a loop that corresponds to the fixed interval cleaning schedule. As shown, in this loop, the cleaning control signal generator 1460 may access the default schedule stored in storage 1470 and checks, at 1495, against a timer to see if it is time to execute the cleaning. When it is at the specified fixed time interval, the cleaning control signal generator 1460 generates, at 1497, the control signals corresponding to the scheduled cleaning activities in the order of the specified temporal sequence (as discussed above) and then send, at 1499, the generated control signals to appropriate controllers (1320, 1330, . . . , and 1340) in the specified temporal sequence to carry out the scheduled cleaning activities. The process continues to loop back so that the environment-proof sensor housing assembly can be regularly cleaned.

In some embodiments, the fixed-interval cleaning mode and adaptive cleaning mode may be used in a mixed manner. For instance, the fixed-interval cleaning mode may be a default mode. At the same time, the components provided for carrying out the adaptive cleaning operation (the sensor data feature extractor 1400, the degradation cause classifier 1410, the cleaning need determiner 1420. The cleaning activity scheduler 1440, the cleaning tool parameter analyzer 1450) may continue to operate to determine whether there is any cleaning needed. If there is, then an adaptive cleaning schedule is created and carried out. This adaptive cleaning schedule may or may not preempt the default cleaning schedule. Through the mechanism discussed herein, the quality of sensed information may be enhanced against any negative impact from the environment.

Figure 15:
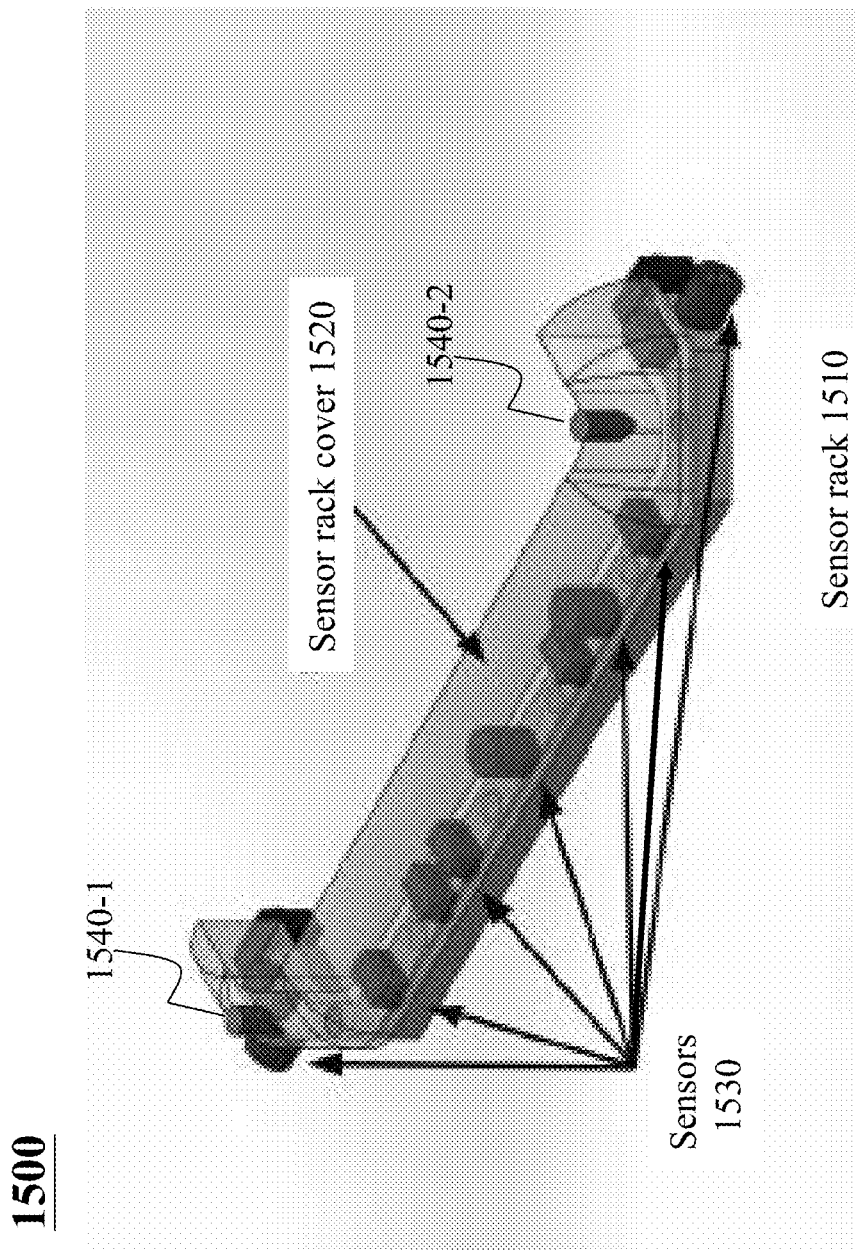
FIG. 15 depicts an exemplary construct of an environment-proof sensor rack assembly, in accordance with an embodiment of the present teaching.

As discussed herein, in some embodiments, multiple sensors may be mounted on a sensor rack, which may then be installed on a vehicle to provide different types of sensor information to the vehicle to facilitate autonomous driving. The discussion above is directed to a sensor housing assembly for an individual sensor. Similar concepts discussed herein for environment-proof sensing quality control may be applied to a sensor rack with appropriate modifications. FIG. 15 depicts an exemplary sensor rack 1510 with a sensor rack cover 1520 thereon, in accordance with an embodiment of the present teaching. Compared with the sensor rack in FIG. 6 having multimodal sensors mounted thereon, the sensor rack 1510 has a cover 1520 to prevent, e.g., debris, rain, snow, dust, etc. to be deposited on the sensors directly. As discussed herein, although the sensors 1530 are protected by the cover, the cover itself may also be subject to the negative impact of the environment. Thus, the need for cleaning the cover exists.

The sensor rack cover 1520 as illustrated in FIG. 15 differs from the environment-proof sensor housing assembly 1120 in several aspects. First, the exemplary sensor rack cover 1520 has an extended length with turns, e.g., 1540-1 and 1540-2. Such turns are necessary when the rack turns, which has advantage of installing sensors that can observe information from different directions. In addition, the sensor rack cover 1520 has curved surface. While it is possible to use flat surfaces such as the environment-proof sensor housing assembly 1120, there may be certain advantages of having curved surfaces. For example, with a curve surface, it is less likely for debris to stay on the cover, especially when the vehicle is in motion. While a cover with curved surface may reduce the chance for debris to stay on, there may still be a need to introduce mechanisms to allow cleaning the cover when there is a need. The environment-proof sensor housing assembly as disclosed herein may be applied to the sensor rack cover 1520.

Figure 16A:
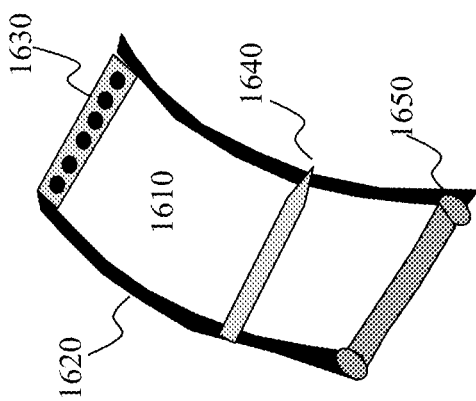
FIG. 16A shows a curved frame-like structure incorporating different cleaning tools therein, in accordance with an embodiment of the present teaching.

FIG. 16A shows an exemplary construct 1600 with a curved structure embedded with a cleaning mechanism, in accordance with an embodiment of the present teaching. The construct 1600 is the same as the combination of 1170 and 1115 with embedded cleaning tools except that 1600 is curved along a longitude direction. The construct 1600 has a frame-like structure 1620. The two parallel sides of frame 1620 in the longitude direction are identically curved. Between the two parallel sides of frame 1620, there may or may not be a curved surface. As shown, the frame-like structure 1620 is attached with different tools/means that can be controlled to carry out cleaning related tasks. This includes hydrophobic spray holes 1630 on top of the 1620, a wiper blade 1640 that can be motorized to move up and down along a track in the frame, and an air hose 1650 at the bottom of the structure 1620 to blow air in an upward direction. To motorize the wiper blade 1640, a motor may be embedded in one of the parallel sides in the longitude direction to drive the wiper blade's movement. When there is a curved surface 1610 between these two parallel side in the longitude direction of the 1620, when the wiper blade 1640 moves, it wipes clean the curved surface 1610. In some embodiments, there may be no curved surface 1610. In these embodiments, the construct 1600 may still be used to clean whatever curved surface of a structure that 1600 is placed on. This is shown in FIG. 16B.

Figure 16B:
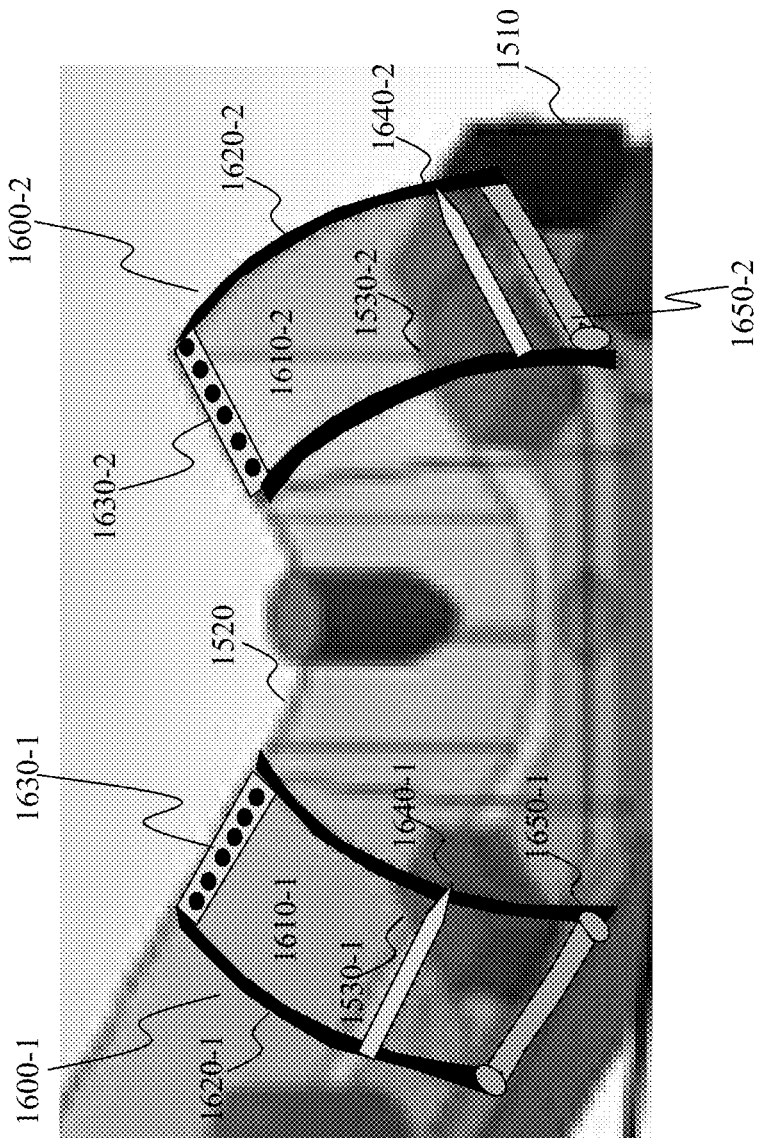
FIG. 16B depicts an exemplary embodiment for environment-proof sensor rack with individual sensors incorporated therein and protected using individual section-based environment-proof assembly, in accordance with an embodiment of the present teaching.

FIG. 16B depicts how the cleaning mechanism shown in FIG. 16A may be used in conjunction with a sensor rack cover 1520 to provide environment-proof sensor rack assembly, in accordance with an embodiment of the present teaching. In this illustrated embodiment, sensor rack 1510 as shown in FIG. 15 has a cover 1520 thereon to protect various sensors 1530 (e.g., 1530-1 and 1530-2). Although sensors are covered and prevent environmental related objects (rains, debris, dust, etc.), the cover 1520 is not. The sensor rack cover 1520 may still be negatively impacted by the environment. To address this, the mechanism as depicted in FIG. 16A may be used to provide section-based environment-proof cleaning mechanisms for each portion of the sensor rack cover 1520 associated with individual sensors the portion covers. For example, there are two exemplary cleaning mechanisms (e.g., 1600-1 and 1600-2) are shown to be attached on portions of the sensor rack cover 1520 to provide the cleaning means to sensor 1530-1 and 1530-2, respectively. Each cleaning mechanism has a corresponding frame-like structure (i.e., 1620-1 and 1620-2) that fits (e.g., the curvature of the frame of each cleaning mechanism is the same as the curvature of the sensor rack cover 1520) a portion of the sensor rack cover 1520 that is in alignment with a respective sensor (e.g., 1530-1 and 1530-2), respectively.

In some embodiments, a cleaning mechanisms (1600-1 or 1600-2) may have a curved surface (e.g., 1610-1 and 1610-2) that closely fit the curved surface of the sensor rack cover 1520. In this situation, each cleaning mechanism is deployed to ensure the quality of sensing by the corresponding sensor by cleaning its own curved surface. Such a configuration achieves environment-proof effect because of the fit between the cleaning mechanism and the sensor rack cover. In some embodiments, a cleaning mechanism may not have its own curved surface. When the cleaning mechanism is attached by fitting to the curved surface of the sensor rack cover 1520, it may be used to clean the directly portion of the sensor rack cover within its frame.

The cleaning mechanism 1600 functions in a similar manner as discussed herein with reference to FIGS. 12A-14C. As seen in FIG. 16B, the cleaning mechanism 1600-1 is deployed to ensure environment-proof sensing quality of sensor 1530-1 and includes hydrophobic spray holes 1630-1, a wiper blade 1640-1, and an air hose 1650-1. These tools may be similarly embedded in the frame-like structure 1600-1 and controlled in a similar manner as what is discussed herein to cleaning the enclosed curved surface (whether it is directly a portion of the curved surface of the sensor rack cover or not). Similarly, the cleaning mechanism 1600-2 is deployed to ensure environment-proof sensing quality of 1530-2 and includes hydrophobic spray holes 1630-2, a wiper blade 1640-2, and an air hose 1650-2, all of which may be controlled in a similar manner as discussed herein. Depending on the level of the sensors, the wiper blades may be controlled to clean in an appropriate range for each sensor. In this configuration, the air hose may be effective to blow off the residuals along the substantially vertical portion of the curved surface.

Figure 17A:
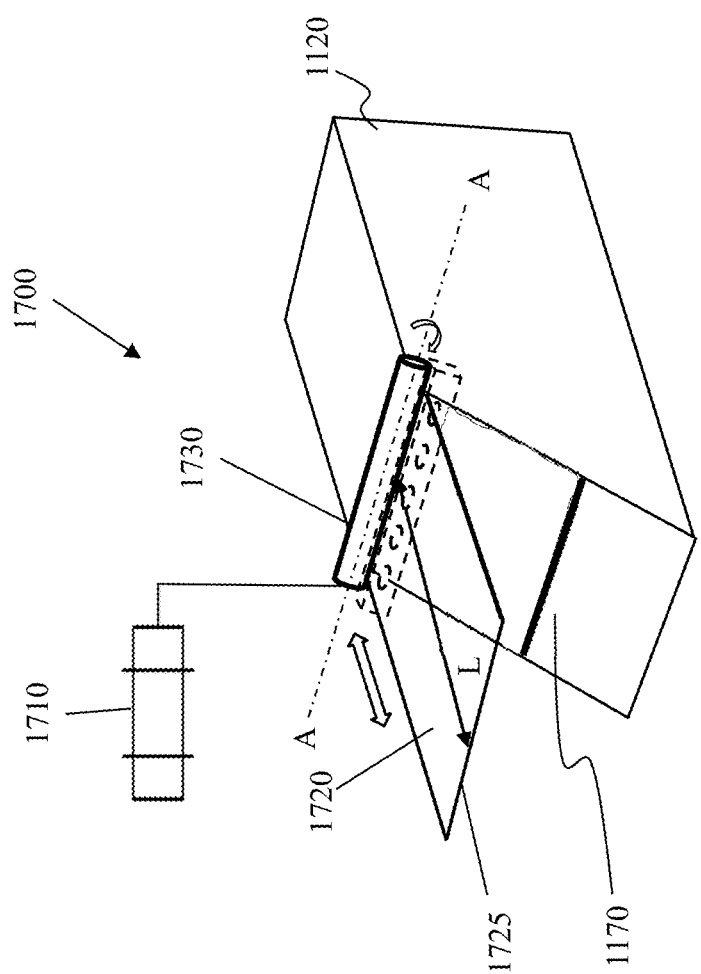
FIGS. 17A-17B illustrate exemplary embodiments for glare protection with regards to the housing assembly and/or sensor rack, in accordance with an embodiment of the present teaching.
Figure 17B:
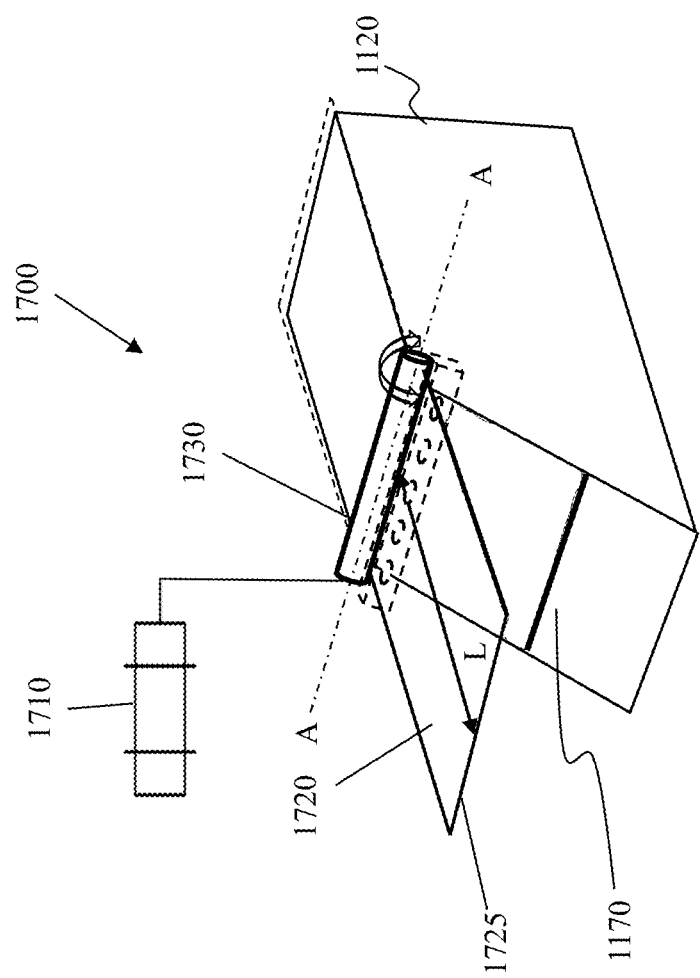

In some situations, sun glare (or light glare) may be an issue that can cause degradation in sensing accurate surrounding information. FIGS. 17A and 17B show exemplary embodiments of a glare blocking mechanism 1700 to address this in the context of the environment-proof sensor or sensor rack assembly, associated with the previously described housing assembly 1120. FIGS. 17A-B illustrate examples of glare blocking mechanism 1700 that may be mounted to and/or on the sensor housing assembly and configured to assist in blocking glare with respect to the at least one sensor therein. The sun glare blocking mechanism 1700 may be provided, for example, above the air hose, on housing assembly 1120 and/or the sensor rack assembly, in accordance with an embodiment. In an accordance with an embodiment, in a case where the sensor housing assembly comprises a slanted surface, the glare blocking mechanism may be mounted above the slanted surface. In an embodiment, the sensor in the housing assembly as shown in FIGS. 17A-B may include a camera with its lens facing the slanted surface, such as shown in FIGS. 11B and 11F (see housing assembly 1120, surface 1170, and camera 1125). The glare blocking mechanism is configured to block sun glare from the sun or other glare such as a light glare from street lights, highway overhead lights or lighting, and other lights, signs, vehicles, etc. that may provide negative impact in the form of glare to the at least one sensor (e.g., camera) within the sensor housing assembly. A controller (not explicitly shown in FIG. 17A or FIG. 17B) for determining negative impact from the environment, including glare, on the at least one sensor may be used to activate the glare blocking mechanism 1700 in response to any such determined negative impact, and, in particular, in response to a determination of glare that may affect readings by the at least one sensor and/or autonomous driving of the vehicle.

In accordance with embodiments, the glare blocking mechanism is configured for movement between a first retracted position, that does not inhibit any viewing by the sensor and/or inhibit any glare, and at least a second extended position in order to block the glare, while allowing the at least one sensor to capture accurate information. In one embodiment, the glare blocking mechanism includes a shade mounted to the sensor housing assembly. The shade may be configured for movement between the first retracted position and any of the at least second extended position. In one embodiment, the shade comprises a body in a rolled assembly, the body comprising a first end and a second end, the first end being secured relative to the sensor housing assembly and wherein the second end configured to be moved towards and away from the rolled assembly, such that the body is configured to be rolled and unrolled about an axis. In the first retracted position, the shade is rolled into the rolled assembly with the second end being provided adjacent to the rolled assembly. In the at least second extended position, the shade is at least partially unrolled from the rolled assembly such that the second end is provided distal from and extending way from both the rolled assembly and the sensor housing assembly so that the body of the shade assists in blocking glare with respect to the at least one sensor. In another embodiment, the shade is mounted on an axle such that its body is configured to flip and rotate about an axis of the axle, the axle being positioned on an end of the sensor housing assembly. In the first, retracted position, the body of the shade is positioned against the sensor housing assembly, and in the at least second, extended position, the body of the shade extends away from the sensor housing assembly and assists in blocking glare with respect to the at least one sensor.

Specifically, FIGS. 17A-B shows an example of a shade 1720 that may be electrically operated such that its body is designed to extend a length L from an edge of the housing assembly (over slanted surface 1170) and/or sensor rack assembly, with its second end 1725 being placed distally from and extending away from the axle and axis A-A, such that any sun or glare from the sun (or environment, e.g., overhead lights) above may be blocked by the shade 1720. In one embodiment, the shade 1720 is a collapsible shade that is configured to be moved between a retracted position (storage or undeployed position, wherein the shade is not activated) and an extended position (or deployed position) wherein the shade is designed to block the sun glare from the sun (or other glare) while allowing the sensor to capture information. For example, the collapsed shade may be provided in the form of a retractable (e.g., rolled) assembly (see FIG. 17A) that is rolled and unrolled from a roll 1730 (mounted on the sensor housing assembly) about axis A-A via an actuator 1510 or electric motor between the retracted and extended positions. The actuator 1510 or motor is controlled via the controller, e.g., activated when glare is determined to have a negative impact on the sensor/camera and/or driving of the vehicle.

As noted, in another embodiment, the shade 1720 may be designed to be mounted to the sensor housing assembly such that its body is configured to rotate and flip back and forth about an axle provided axis A-A. These features and this embodiment is also represented in FIG. 17B, i.e., the shade 1720 may be configured to move from a first, stored (retracted) position (e.g., on top of housing assembly 1120 or behind rack cover 1520, as shown in dashed lines in FIG. 17B) to a second, extended (in-use) position (e.g., as shown in FIG. 17B, wherein the length of the shade 1720 extends from the edge and second end 1725 being placed distally from and extending away from the axle and axis A-A), via actuator 1510 or motor.

Figure 18:
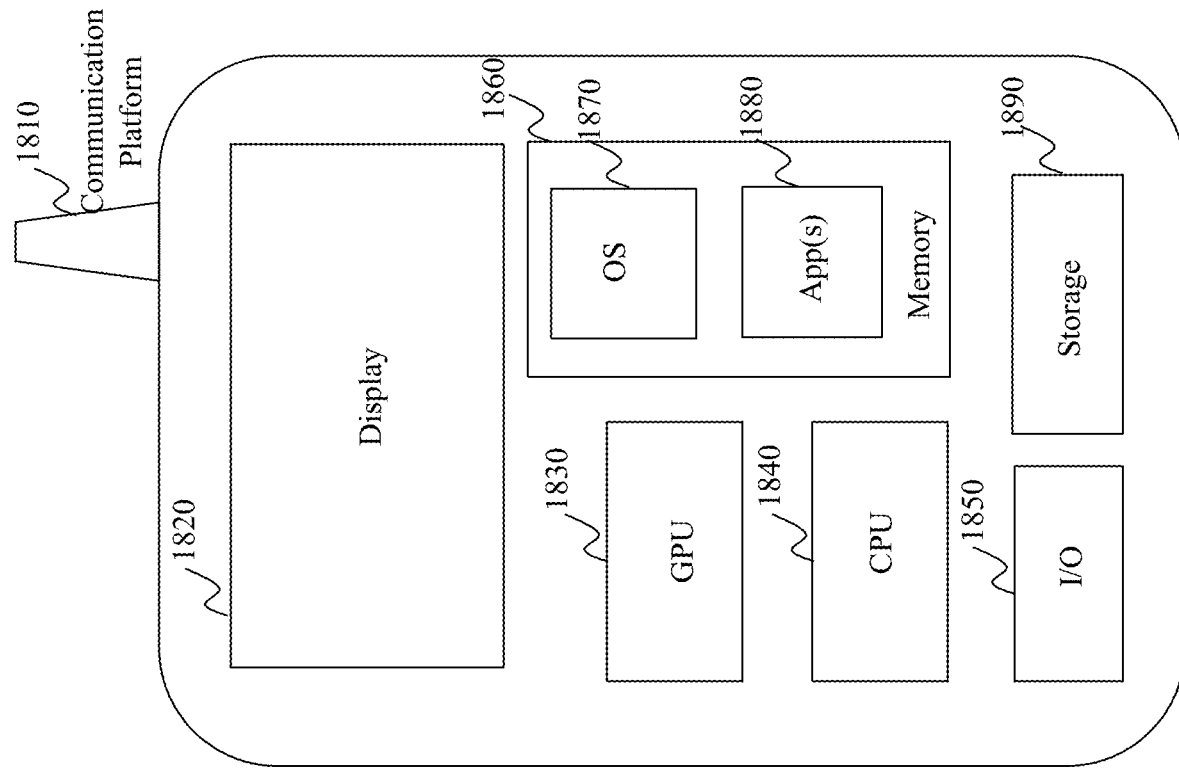
FIG. 18 is an illustrative diagram of an exemplary mobile device architecture that may be used to realize a specialized system implementing the present teaching in accordance with various embodiments.

FIG. 18 is an illustrative diagram of an exemplary mobile device architecture that may be used to realize a specialized system implementing the methods of protecting sensors and sensor assembly as disclosed in the present teaching in accordance with various embodiments. In this example, a device on which the present teaching is implemented corresponds to a mobile device 1800, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 1800 may include one or more central processing units ("CPUs") 1840, one or more graphic processing units ("GPUs") 1830, a display 1820, a memory 1860, a communication platform 1810, such as a wireless communication module, storage 1890, and one or more input/output (I/O) devices 1840. Any other suitable component, including but not limited to a system bus or a controller (not shown), may also be included in the mobile device 1800. As shown in FIG. 18 a mobile operating system 1870 (e.g., iOS, Android, Windows Phone, etc.), and one or more applications 1880 may be loaded into memory 1860 from storage 1890 in order to be executed by the CPU 1840. The applications 1880 may include suitable mobile apps for managing the tasks related to the present teaching on mobile device 1800. User interactions may be achieved via the I/O devices 1840.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming and general operation of such computer equipment and as a result the drawings should be self-explanatory.

Figure 19:
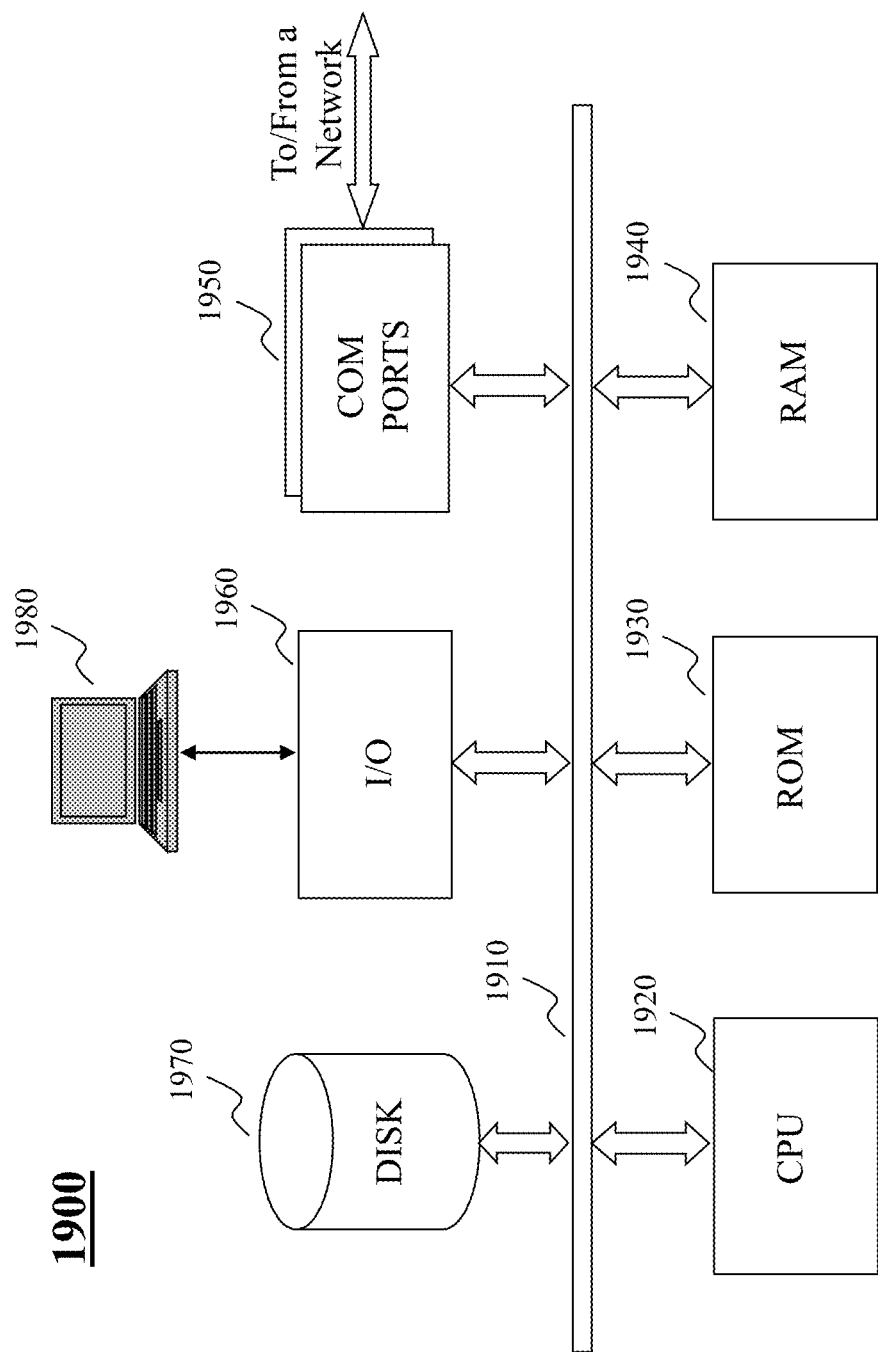
FIG. 19 is an illustrative diagram of an exemplary computing device architecture that may be used to realize a specialized system implementing the present teaching in accordance with various embodiments.

FIG. 19 is an illustrative diagram of an exemplary computing device architecture that may be used to realize a specialized system implementing various functionalities related to the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1900 may be used to implement any component of conversation or dialogue management system, as described herein. For example, various functions associated with the present teaching may be implemented on a computer such as computer 1900, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 1900, for example, includes COM ports 1950 connected to and from a network connected thereto to facilitate data communications. Computer 1900 also includes a central processing unit (CPU) 1920, in the form of one or more processors, for executing program instructions. The exemplary computer platform includes an internal communication bus 1910, program storage and data storage of different forms (e.g., disk 1970, read only memory (ROM) 1930, or random access memory (RAM) 1940), for various data files to be processed and/or communicated by computer 1900, as well as possibly program instructions to be executed by CPU 1920. Computer 1900 also includes an I/O component 1960, supporting input/output flows between the computer and other components therein such as user interface elements 1980. Computer 1900 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on at least one machine including at least one processor, memory, and communication platform for connecting to a network for detecting sensor tampering, the method comprising:
receiving, from an inertial measurement unit (IMU) attached to a structure hosting at least one sensor, information including one or more measurements associated with the IMU, wherein the at least one sensor is deployed on a vehicle for sensing surrounding information to facilitate autonomous driving;
analyzing the one or more measurements with respect to pre-determined criteria to detect tampering of the at least one sensor; and
generating, if the tampering is detected, a response to the tampering detected.

2. The method of claim 1, wherein
the structure corresponds to a housing or a sensor rack with a plurality of sensors mounted thereon; and
the IMU and the structure are attached in such a way that they form a rigid integral structure.

3. The method of claim 1, wherein the response is used to control performing at least one of:
triggering an alarm on the vehicle to produce a siren sound;
turning on selected sensors deployed on the vehicle to record information surrounding the tampering; and
transmitting signals to a remote site via network connection to report the tampering.

4. The method of claim 3, wherein the signals transmitted to the remote site include an alert of the tampering and the information recorded by the selected sensors.

5. The method of claim 1, wherein the step of analyzing comprises:
accessing a state of the vehicle;
determining whether a first of the one or more measurements is to be used to detect the tampering in the state of the vehicle;
comparing, if the first measurement is to be used to detect the tampering, the first measurement with the pre-determined criteria to detect the tampering.

6. The method of claim 5, wherein
the state of the vehicle is one of a motion state and a parking state; and
the first measurement corresponds to a vibration measure set to be used to detect tampering if the vehicle is in a parking state.

7. The method of claim 6, further comprising:
analyzing a second of the one or more measurements indicative of a pose of the IMU; and
determining the tampering based on the first and the second measurements.

8. Machine readable and non-transitory medium having information recorded thereon for detecting sensor tampering, wherein the information, when read by the machine, causes the machine to perform:
receiving, from an inertial measurement unit (IMU) attached to a structure hosting at least one sensor, information including one or more measurements associated with the IMU, wherein the at least one sensor is deployed on a vehicle for sensing surrounding information to facilitate autonomous driving;
analyzing the one or more measurements with respect to pre-determined criteria to detect tampering of the at least one sensor; and
generating, if the tampering is detected, a response to the tampering detected.

9. The medium of claim 8, wherein
the structure corresponds to a housing or a sensor rack with a plurality of sensors mounted thereon; and
the IMU and the structure are attached in such a way that they form a rigid integral structure.

10. The medium of claim 8, wherein the response is used to control performing at least one of:
triggering an alarm on the vehicle to produce a siren sound;
turning on selected sensors deployed on the vehicle to record information surrounding the tampering; and
transmitting signals to a remote site via network connection to report the tampering.

11. The medium of claim 10, wherein the signals transmitted to the remote site include an alert of the tampering and the information recorded by the selected sensors.

12. The medium of claim 8, wherein the step of analyzing comprises:
accessing a state of the vehicle;
determining whether a first of the one or more measurements is to be used to detect the tampering in the state of the vehicle;
comparing, if the first measurement is to be used to detect the tampering, the first measurement with the pre-determined criteria to detect the tampering.

13. The medium of claim 12, wherein
the state of the vehicle is one of a motion state and a parking state; and
the first measurement corresponds to a vibration measure set to be used to detect tampering if the vehicle is in a parking state.

14. The medium of claim 13, wherein the information, when read by the machine, further causes the machine to perform:
analyzing a second of the one or more measurements indicative of a pose of the IMU; and
determining the tampering based on the first and the second measurements.

15. A system for detecting sensor tampering, comprising:
an update controller configured for
receiving, from an inertial measurement unit (IMU) attached to a structure hosting at least one sensor, information including one or more measurements associated with the IMU, wherein the at least one sensor is deployed on a vehicle for sensing surrounding information to facilitate autonomous driving, and
analyzing the one or more measurements with respect to pre-determined criteria to detect tampering of the at least one sensor; and
a sensor special operation controller configured for generating, if the tampering is detected, a response to the tampering detected.

16. The system of claim 15, wherein the structure corresponds to a housing or a sensor rack with a plurality of sensors mounted thereon; and the IMU and the structure are attached in such a way that they form a rigid integral structure.

17. The system of claim 15, wherein the response is used to control performing at least one of:

triggering an alarm on the vehicle to produce a siren sound;

turning on selected sensors deployed on the vehicle to record information surrounding the tampering; and transmitting signals to a remote site via network connection to report the tampering.

18. The system of claim 17, wherein the signals transmitted to the remote site include an alert of the tampering and the information recorded by the selected sensors.

19. The system of claim 15, wherein the step of analyzing comprises:

accessing a state of the vehicle;

determining whether a first of the one or more measurements is to be used to detect the tampering in the state of the vehicle;

comparing, if the first measurement is to be used to detect the tampering, the first measurement with the predetermined criteria to detect the tampering.

20. The system of claim 19, wherein the state of the vehicle is one of a motion state and a parking state; and the first measurement corresponds to a vibration measure set to be used to detect tampering if the vehicle is in a parking state.

21. The system of claim 20, wherein a second of the one or more measurements indicative of a pose of the IMU is further analyzed and used, together with the first measurement, for determining the tampering.

* * * * *